United States Patent
Park et al.

(10) Patent No.: US 10,944,183 B2
(45) Date of Patent: Mar. 9, 2021

(54) METHOD FOR TRANSMITTING AND RECEIVING CHANNEL STATE INFORMATION IN MULTI-ANTENNA WIRELESS COMMUNICATION SYSTEM, AND DEVICE THEREFOR

(71) Applicant: LG ELECTRONICS INC., Seoul (KR)

(72) Inventors: Haewook Park, Seoul (KR); Jonghyun Park, Seoul (KR); Kijun Kim, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/096,681

(22) PCT Filed: Apr. 25, 2017

(86) PCT No.: PCT/KR2017/004361
§ 371 (c)(1),
(2) Date: Oct. 25, 2018

(87) PCT Pub. No.: WO2017/188693
PCT Pub. Date: Nov. 2, 2017

(65) Prior Publication Data
US 2019/0157770 A1     May 23, 2019

Related U.S. Application Data

(60) Provisional application No. 62/327,391, filed on Apr. 25, 2016, provisional application No. 62/353,565, filed on Jun. 23, 2016.

(51) Int. Cl.
*H04B 7/0456* (2017.01)
*H01Q 21/06* (2006.01)
*H01Q 3/26* (2006.01)
*H04B 7/06* (2006.01)
(Continued)

(52) U.S. Cl.
CPC .......... *H01Q 21/061* (2013.01); *H01Q 3/2605* (2013.01); *H04B 7/0478* (2013.01);
(Continued)

(58) Field of Classification Search
CPC .. H04B 7/0478; H04B 7/0626; H04B 7/0469; H04B 7/0639; H04B 7/063;
(Continued)

(56) References Cited

U.S. PATENT DOCUMENTS

2012/0039298 A1   2/2012   Lee et al.
2015/0117561 A1   4/2015   Benjebbour et al.
(Continued)

OTHER PUBLICATIONS

PCT International Application No. PCT/KR2017/004361, International Search Report dated Aug. 17, 2017, 3 pages.
(Continued)

*Primary Examiner* — Jae Y Lee
*Assistant Examiner* — Aixa A Guadalupe Cruz
(74) *Attorney, Agent, or Firm* — Lee, Hong, Degerman, Kang & Waimey

(57) ABSTRACT

In an aspect of the present invention, a method for a user equipment to report channel state information (CSI) in a multi-antenna wireless communication system may include the steps of receiving first configuration information about a non-precoded first channel state information-reference signal (CSI-RS) configuration from a base station, receiving the first CSI-RS, reporting, to the base station, the first CSI generated based on the first CSI-RS, and reporting, to the base station, codebook configuration information about a codebook configuration which is a basis for generating the first CSI.

14 Claims, 17 Drawing Sheets

(51) Int. Cl.
*H04L 1/18* (2006.01)
*H04W 72/04* (2009.01)
*H04B 7/10* (2017.01)
*H04L 1/16* (2006.01)

(52) U.S. Cl.
CPC ......... *H04B 7/0482* (2013.01); *H04B 7/0632* (2013.01); *H04L 1/1812* (2013.01); *H04W 72/0446* (2013.01); *H04B 7/0669* (2013.01); *H04B 7/10* (2013.01); *H04L 1/1607* (2013.01)

(58) Field of Classification Search
CPC .. H04B 7/0632; H04B 7/0417; H04B 7/0617; H04B 7/0413; H04B 7/0482; H04B 7/0421; H04B 7/0452; H04B 7/0608; H04B 7/061; H04B 7/0619; H04B 7/0621; H04B 7/0669; H04L 5/0057; H04L 5/0051; H04L 5/0053
See application file for complete search history.

(56) References Cited

U.S. PATENT DOCUMENTS

2019/0036579 A1* 1/2019 Wei ..................... H04B 7/0486
2019/0058560 A1* 2/2019 Chen .................... H04W 24/08
2019/0068266 A1* 2/2019 Chang ................. H04W 72/046

OTHER PUBLICATIONS

Huawei, et al., "CSI reporting mechanism for joint utilization of different CSI-RS types", 3GPP TSG RAN WG1 Meeting #84bis, R1-162598, Apr. 2016, 6 pages.
Samsung, "Linear combination codebook and CSI reporting", 3GPP TSG RAN WG1 Meeting #84bis, R1-162693, Apr. 2016, 8 pages.
NTT Docomo, "Codebook enhancement for non-precoded CSI-RS", 3GPP TSG RAN WG1 Meeting #84bis, R1-162970, Apr. 2016, 5 pages.

* cited by examiner (a)

(b)

(a)

(b)

Beam group pattern

Config 1

Config 2

Config 3

Config 4

METHOD FOR TRANSMITTING AND RECEIVING CHANNEL STATE INFORMATION IN MULTI-ANTENNA WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2017/004361, filed on Apr. 25, 2017, which claims the benefit of U.S. Provisional Application No. 62/327,391, filed on Apr. 25, 2016, and 62/353,565, filed on Jun. 23, 2016, the contents of which are all hereby incorporated by reference herein in their entireties.

TECHNICAL FIELD

The present invention relates to a wireless communication system and, more particularly, to a method of transmitting and receiving channel state information in a wireless communication system supporting a multi-antenna system (particularly, a 2 dimensional active antenna system (2D AAS) and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed service, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

An object of the present invention is to propose a method of transmitting and receiving channel state information in a wireless communication system supporting a multi-antenna system (particularly, 2D AAS).

Furthermore, an object of the present invention is to propose hybrid CSI reporting method in which a non-precoded CSI-RS and a beamformed CSI-RS are mixed (i.e., combined).

Furthermore, an object of the present invention is to propose a method of signaling information reported as CSI in a hybrid CSI reporting method.

Technical objects to be achieved in the present invention are not limited to the aforementioned technical objects, and other technical objects not described above may be evidently understood by a person having ordinary skill in the art to which the present invention pertains from the following description.

Technical Solution

In an aspect of the present invention, a method for a user equipment to reporting channel state information (CSI) in a multi-antenna wireless communication system may include receiving first configuration information about a non-precoded first channel state information-reference signal (CSI-RS) configuration from a base station, receiving the first CSI-RS, reporting, to the base station, the first CSI generated based on the first CSI-RS, and reporting, to the base station, codebook configuration information about a codebook configuration which is a basis for generating the first CSI.

Furthermore, the first configuration information includes antenna port layout information which is a basis for generating the first CSI and oversampling factor information applied to the antenna layout, and may be transmitted to the user equipment through higher layer signaling.

Furthermore, the codebook configuration information may indicate at least one of a plurality of codebook configurations, and the plurality of codebook configurations may be previously defined to have different beam patterns.

Furthermore, the codebook configuration information may be reported to the base station independently of the first CSI or may be joint-encoded with the first CSI and reported to the base station.

Furthermore, a plurality of precoding matrix indicators (PMIs) derived based on the codebook configuration may be reported to the base station as the first CSI.

Furthermore, the plurality of PMIs may be selected as many as a preset number determined based on a channel quality indicator (CQI) and/or a signal-to-interference-plus-noise ratio (SINR) and may be reported to the base station.

Furthermore, when two identical beams overlap between beam groups specified by neighboring PMIs according to the codebook configuration, the plurality of PMIs may be restricted to indicate only an even number or an odd number.

Furthermore, the plurality of PMIs may be derived based on the codebook configuration in the state in which the number of transmission layers is assumed to be "1", and a rank indicator (RI) indicating the number of transmission layers may not be reported to the base station as the CSI.

Furthermore, at least one RI associated with at least one PMI of the plurality of PMIs may be reported to the base station as the first CSI.

Furthermore, when the at least one RI is reported to the base station as the first CSI, one RI associated with a PMI having the best performance or a PMI having the worst performance among the plurality of PMIs, one RI associated with the plurality of PMIs in common, or a plurality of RIs associated with the plurality of PMIs, respectively, may be reported.

Furthermore, may further include receiving, from the base station, second configuration information for a second CSI report based on a beamformed second CSI-RS and reporting, to the base station, second CSI generated based on the second configuration information.

Furthermore, the first configuration information and the second configuration information are received by the user equipment through configuration information for a single CSI process.

In another aspect of the present invention, a user equipment reporting channel state information (CSI) in a multi-antenna wireless communication system includes a radio frequency (RF) unit for transmitting and receiving radio signals and a processor controlling the RF unit, wherein the processor may receive first configuration information about a non-precoded first channel state information-reference signal (CSI-RS) configuration from a base station, may receive the first CSI-RS, reports, to the base station, the first CSI generated based on the first CSI-RS, and may report, to the base station, codebook configuration information about a codebook configuration, that is, a basis for generating the first CSI.

Furthermore, the codebook configuration information may indicate at least one of a plurality of codebook configurations, and the plurality of codebook configurations may be previously defined to have different beam patterns.

Furthermore, the codebook configuration information may be reported to the base station independently of the CSI or may be joint-encoded with the CSI and reported to the base station.

Advantageous Effects

In accordance with an embodiment of the present invention, feedback overhead for a channel state information report can be significantly reduced in a wireless communication system supporting a multi-antenna system (particularly, 2D-AAS).

In accordance with an embodiment of the present invention, in a wireless communication system supporting a multi-antenna system (particularly, 2D-AAS), more accurate channel state information can be reported to a base station by taking into consideration the environments of a UE, such as the location and moving state of the UE.

Effects which may be obtained in the present invention are not limited to the aforementioned effects, and other technical effects not described above may be evidently understood by a person having ordinary skill in the art to which the present invention pertains from the following description.

DESCRIPTION OF DRAWINGS

The accompanying drawings, which are included herein as a part of a description in order to help understanding of the present invention, provide embodiments of the present invention, and describe the technical features of the present invention with the description below.

MODE FOR INVENTION

Figure 1:
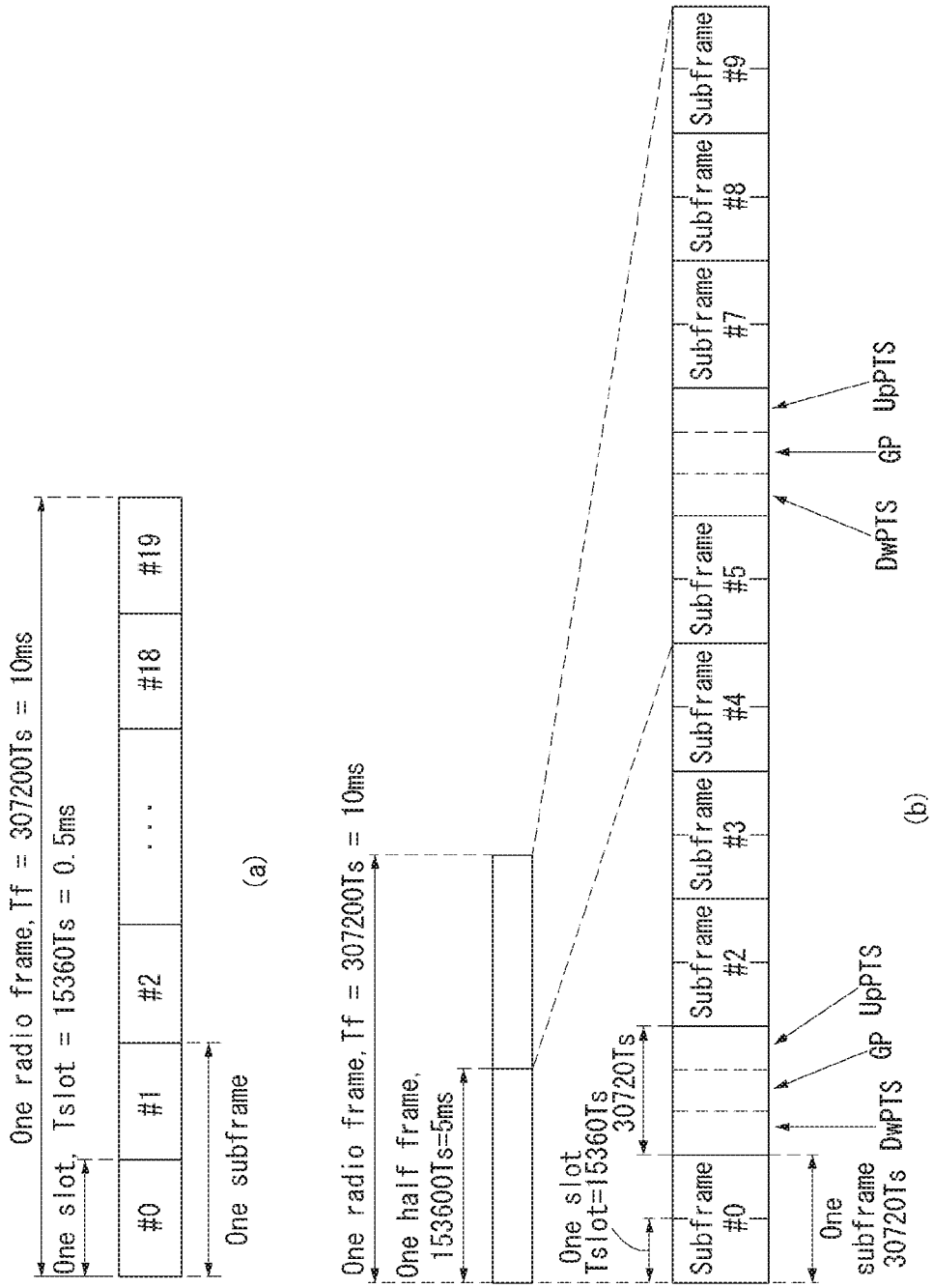
FIG. 1 illustrates the structure of a radio frame in a wireless communication system to which an embodiment of the present invention may be applied.

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described as being performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the device may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which an Embodiment of the Present Invention May be Applied

FIG. 1 shows the structure of a radio frame in a wireless communication system to which an embodiment of the present invention may be applied.

3GPP LTE/LTE-A support a radio frame structure type 1 which may be applicable to frequency division duplex (FDD) and a radio frame structure which may be applicable to time division duplex (TDD).

In FIG. 1, the size of the radio frame in a time domain is represented as a multiple of a time unit of $T\_s=1/(15000*2048)$. Downlink and uplink transmission includes a radio frame having a period of $T\_f=307200*T\_s=10$ ms.

FIG. 1(a) illustrates the structure of a type 1 radio frame. The type 1 radio frame may be applied to both full duplex and half duplex FDD.

The radio frame includes 10 subframes. One radio frame includes 20 slots of $T\_slot=15360*T\_s=0.5$ ms in length. 0 to 19 indices are assigned to the respective slots. One subframe includes consecutive 2 slots in the time domain, and a subframe i includes a slot 2i and a slot 2i+1. The time taken to send one subframe is called a transmission time period (TTI). For example, the length of one subframe may be 1 ms, and the length of one slot may be 0.5 ms.

In FDD, uplink transmission and downlink transmission are divided in a frequency domain. There is no limit to full duplex FDD, whereas UE cannot send and receive data at the same time in a half duplex FDD operation.

One slot includes a plurality of orthogonal frequency division multiplexing (OFDM) symbols in the time domain and includes a plurality of resource blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of consecutive subcarriers in one slot.

FIG. 1(b) shows a frame structure type 2.

The frame structure type 2 includes two half frames, each having a length of $153600*T\_s=5$ ms. Each half frame includes 5 subframes, each having a length of $30720*T\_s=1$ ms.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" indicates a subframe for downlink transmission, "U" indicates a subframe for uplink transmission, and "S" indicates a special subframe including three types of fields, including a downlink pilot time slot (DwPTS), a guard period (GP), and an uplink pilot time slot (UpPTS).

The DwPTS is used for initial cell search, synchronization or channel estimation in UE. The UpPTS is used for synchronization of uplink transmission for UE and channel estimation in an eNB. The GP is a period for removing interference generated in uplink due to multi-path delay of a downlink signal between uplink and downlink.

Each subframe i includes a slot 2i and a slot 2i+1, each having T_slot=15360*T_s=0.5 ms length.

An uplink-downlink configuration may be classified into 7 types. The positions and/or number of downlink subframes, special subframes, and uplink subframe are different in each configuration.

A point at which the downlink changes into the uplink or a point at which the uplink changes into the downlink is called a switching point. Switch-point periodicity means the period in which an aspect in which an uplink subframe and a downlink subframe are changed is identically repeated. Both 5 ms and 10 ms are supported for the switch-point periodicity. If the switch-point periodicity has the period of the 5 ms downlink-uplink switching point, a special subframe(s) is present every half-frame. If the switch-point periodicity has the period of the 5 ms downlink-uplink switching point, a special subframe(s) is present only in the first half-frame.

In all of configurations, No. 0 and No. 5 subframes and a DwPTS are the intervals for only downlink transmission. A subframe subsequent to the UpPTS and subframe is always the interval for uplink transmission.

Such an uplink-downlink configuration may be known by both a base station and a UE as system information. The base station may notify the UE of a change in the uplink-downlink allocation state of a radio frame by transmitting only the index of configuration information whenever uplink-downlink configuration information is changed. Furthermore, the configuration information is a kind of downlink control information and may be transmitted a physical downlink control channel (PDCCH) like other scheduling information and may be transmitted to all of UEs within a cell in common through a broadcast channel as broadcasting information.

Table 2 shows configurations (lengths of a DwPTS/GP/UpPTS) of special subframes.

Table 2 shows the configuration (the length of a DwPTS/GP/UpPTS) of a special subframe.

resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

Figure 3:
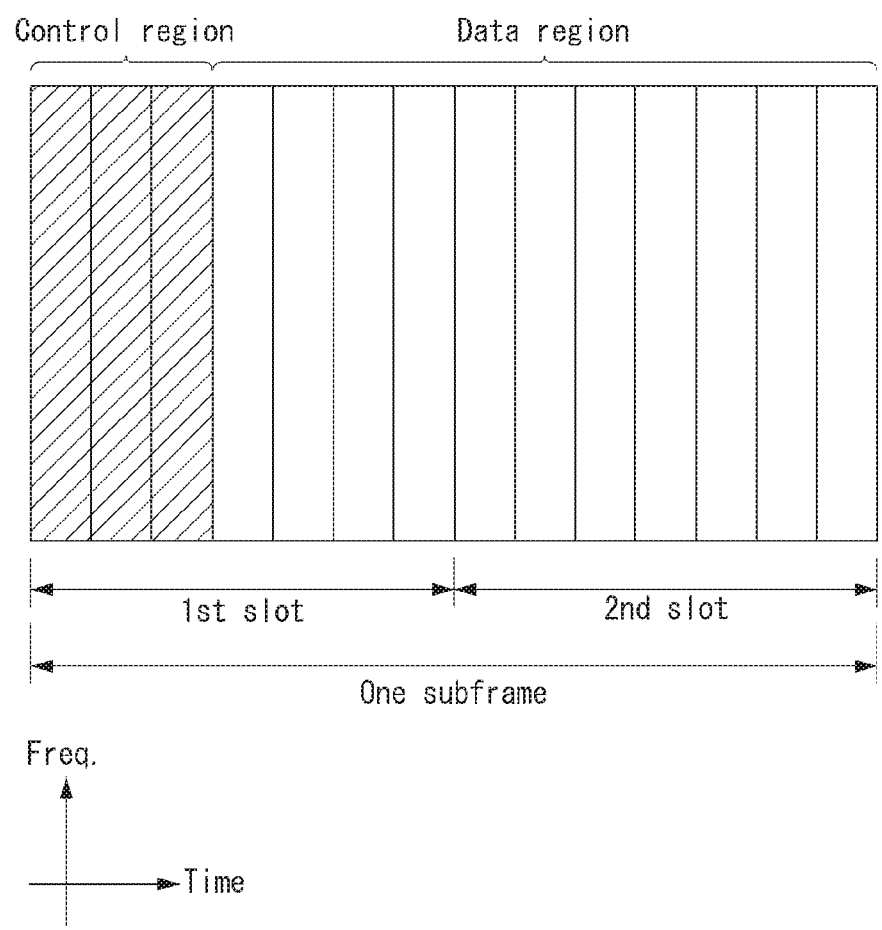
FIG. 3 illustrates the structure of a downlink subframe in a wireless communication system to which an embodiment of the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry the resource allocation and transmission format (this is also called a downlink grant) of a downlink shared channel (DL-SCH), the resource allocation information (this is also called an uplink grant) of an uplink

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | | |
| 8 | 24144 · $T_s$ | | | — | — | — |

The structure of the radio frame according to the example of FIG. 1 is only an example. The number of subcarriers included in a radio frame or the number of slots included in a subframe and the number of OFDM symbols included in a slot may be changed in various ways.

Figure 2:
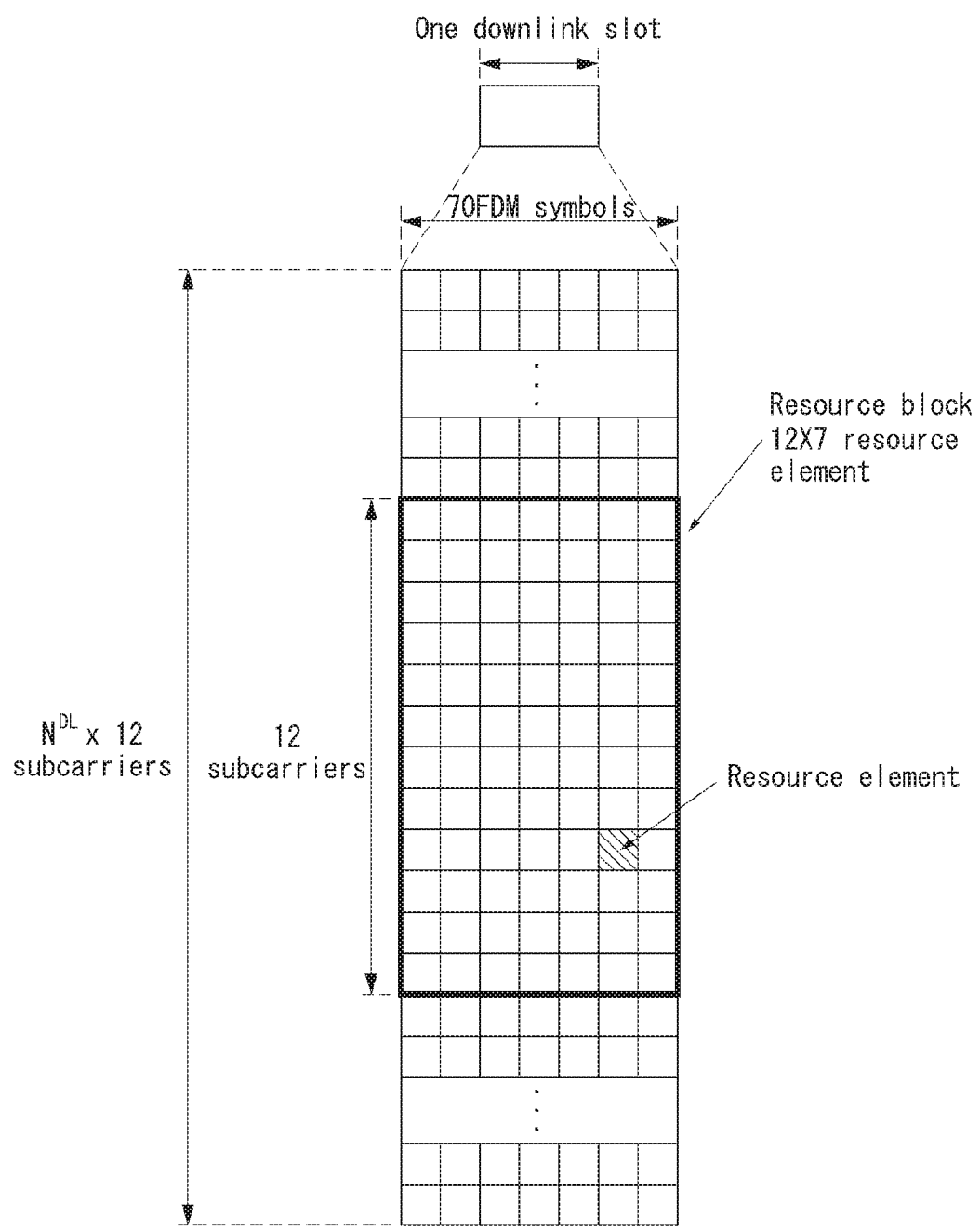
FIG. 2 is a diagram illustrating a resource grid for a downlink slot in a wireless communication system to which an embodiment of the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one shared channel (UL-SCH), paging information of a paging channel (PCH), system information in a DL-SCH, the resource allocation of an upper-layer control message, such as a random access response transmitted in a PDSCH, a set of transmit power control commands for individual UEs within a given UE group, and the activation of a Voice over IP (VoIP). The plurality of PDCCHs may be transmitted within a control region, and a UE may monitor a plurality of PDCCHs. A PDCCH includes one control channel element (CCE) or a set of a plurality of continuous control channel elements (CCEs). The CCE is a logical allocation unit used to provide a PDCCH with a coding rate according to the state of a radio channel. The CCE corresponds to a plurality of resource element groups. The format of a PDCCH and the number of available bits of a PDCCH are determined based on the number of CCEs and an association relation between coding rates provided by the CCEs.

A base station determines a PDCCH format based on a DCI to be transmitted to a UE and attaches cyclic redundancy check (CRC) to control information. The CRC is masked with a unique identifier (this is also called a radio network temporary identifier (RNTI)) depending on the owner or use of the PDCCH. If the PDCCH is a PDCCH for a specific UE, the CRC may be masked with a unique identifier, for example, a cell-RNTI (C-RNTI) of the UE. Alternatively, if the PDCCH is a PDCCH for a paging message, the CRC may be masked with a paging indication identifier, for example, a paging-RNTI (P-RNTI). If the PDCCH is a PDCCH for system information, more specifically, a system information block (SIB), the CRC may be masked with a system information identifier, a system information-RNTI (SI-RNTI). In order to indicate a random access response, that is, a response for the transmission of the random access preamble of the UE, the CRC may be masked with a random access-RNTI (RA-RNTI).

Figure 4:
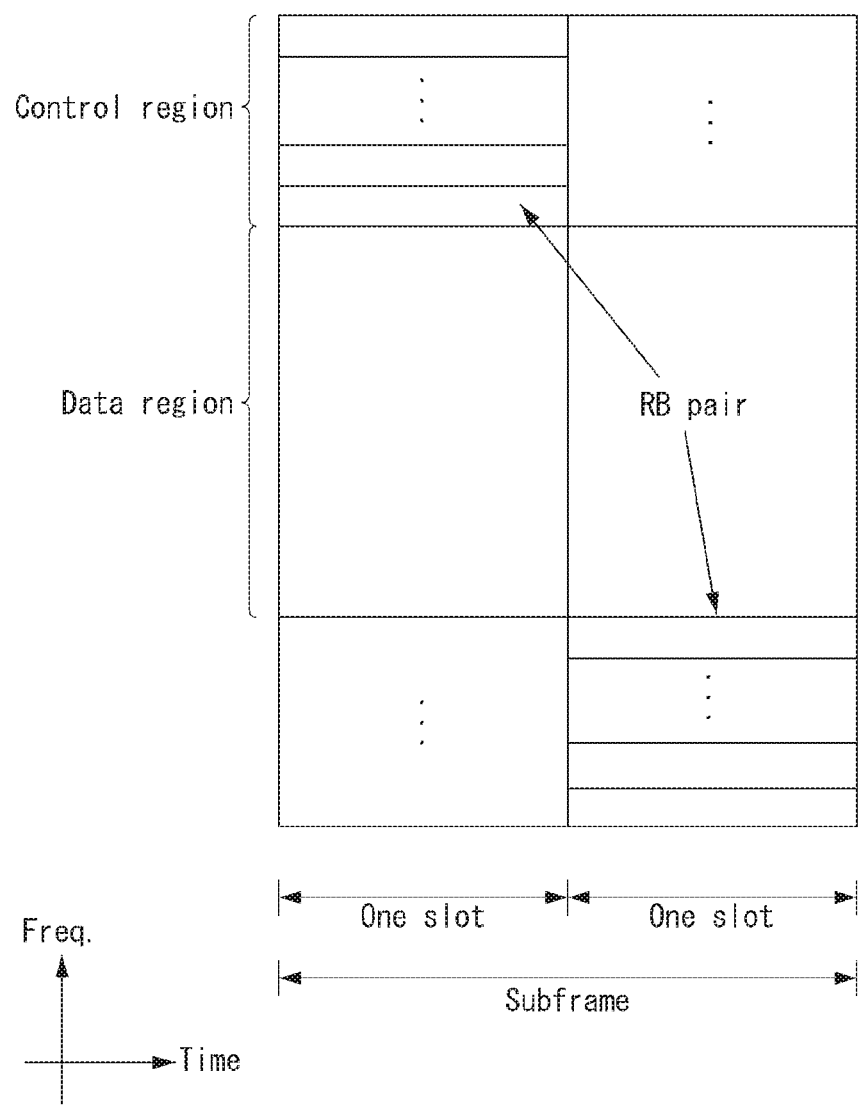
FIG. 4 illustrates the structure of an uplink subframe in a wireless communication system to which an embodiment of the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
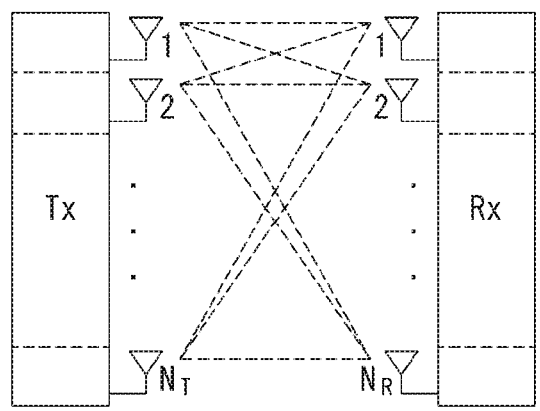
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \qquad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case, may include a maximum likelihood detection (MLD) receiver, a zero-forcing (ZF) receiver, a minimum mean square error (MMSE) receiver, diagonal-bell laboratories layered space-time (D-BLAST), and vertical-bell laboratories layered space-time (V-BLAST). In particular, if a transmission end can be aware of channel information, a singular value decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$s=[s_1,s_2,\ldots s_{N_T}]^T \quad \text{[Equation 2]}$$

Transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s}=[\hat{s}_1,\hat{s}_2,\ldots \hat{s}_{N_T}]^T=[P_1s_1,P_2s_2,\ldots,P_{N_T}s_{N_T}]^T \quad \text{[Equation 3]}$$

In Equation 3, transmission information having controlled transmission power may be represented as follows using the diagonal matrix P of transmission power.

$$\hat{s}=\begin{bmatrix} P_1 & & & 0 \\ & P_2 & & \\ & & \ddots & \\ 0 & & & P_{N_T} \end{bmatrix}\begin{bmatrix} s_1 \\ s_2 \\ \vdots \\ s_{N_T} \end{bmatrix}=Ps \quad \text{[Equation 4]}$$

The information vector having controlled transmission power in Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x=\begin{bmatrix} x_1 \\ x_2 \\ \vdots \\ x_i \\ \vdots \\ x_{N_T} \end{bmatrix}=\begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T1} & w_{N_T2} & \ldots & w_{N_TN_T} \end{bmatrix}\begin{bmatrix} \hat{s}_1 \\ \hat{s}_2 \\ \vdots \\ \hat{s}_j \\ \vdots \\ \hat{s}_{N_T} \end{bmatrix}=W\hat{s}=WPs \quad \text{[Equation 5]}$$

In Equation 5, w_ij denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in the case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y=[y_1,y_2,\ldots,y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
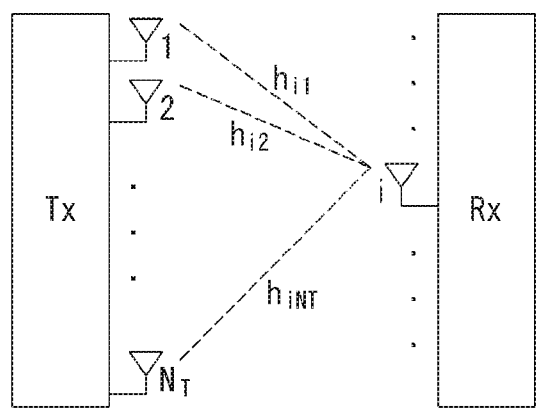
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1},h_{i2},\ldots,h_{iN_T}] \quad \text{[Equation 7]}$$

Furthermore, if all channels from the N_T transmission antenna to N_R reception antennas are represented through a matrix expression, such as Equation 7, they may be represented as follows.

$$H=\begin{bmatrix} h_1^T \\ h_2^T \\ \vdots \\ h_i^T \\ \vdots \\ h_{N_R}^T \end{bmatrix}=\begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

Additive white Gaussian noise (AWGN) is added to an actual channel after the actual channel experiences the channel matrix H. Accordingly, AWGN n_1, n_2, . . . , n_N_R added to the N_R reception antennas, respectively, are represented using a vector as follows.

$$n=[n_1,n_2,\ldots n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R)$$ [Equation 11]

Furthermore, if a matrix is subjected to Eigen value decomposition, a rank may be defined as the number of Eigen values that belong to Eigen values and that are not 0. Likewise, if a rank is subjected to singular value decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Hereinafter, a codebook-based precoding scheme is described more specifically in relation to the aforementioned MIMO transmission schemes.

Figure 7:
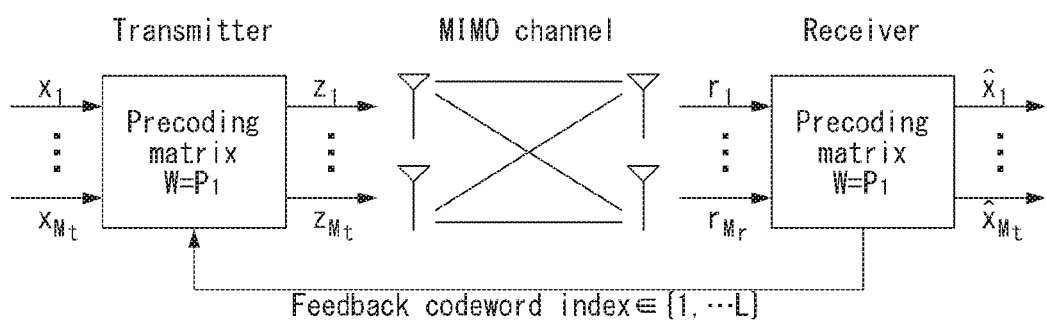
FIG. 7 is a diagram for illustrating a basic concept of codebook-based precoding in a wireless communication system to which the present invention may be applied.

FIG. 7 is a diagram for illustrating a basic concept of codebook-based precoding in a wireless communication system to which the present invention may be applied.

In the case of a codebook-based precoding method, a transmission stage and a reception stage share codebook information including a predefined specific number of precoding matrices depending on a transmission rank, the number of antennas, etc.

That is, if feedback information is finite, a precoding-based codebook method may be used.

The reception stage may measure a channel state through a received signal and feed a finite number of pieces of preferred precoding matrix information (i.e., the index of a corresponding precoding matrix) back to the transmission stage based on the aforementioned codebook information. For example, the reception stage may measure a received signal using a maximum likelihood (ML) or minimum mean square error (MMSE) method, and may select the best precoding matrix.

FIG. 7 shows that the reception stage transmits precoding matrix information to the transmission stage for each codebook, but does not need to be limited thereto.

The transmission stage that has received the feedback information from the reception stage may select a specific precoding matrix from a codebook based on the received information. The transmission stage that has selected the precoding matrix performs precoding using a method of multiplying the number of layer signals, corresponding to a transmission rank, by the selected precoding matrix, and may transmit a transmission signal on which precoding has been performed through a plurality of antennas. In the precoding matrix, the number of rows is identical with the number of antennas, and the number of columns is identical with a rank value. Since the rank value is identical with the number of layers, the number of columns is identical with the number of layers. For example, if the number of Tx antennas is 4 and the number of layers is 2, a precoding matrix may consist of a 4×2 matrix. Equation 12 shows an operation of mapping information, mapped to each layer, to each antenna through a precoding matrix in such a case.

$$\begin{bmatrix} y_1 \\ y_2 \\ y_3 \\ y_4 \end{bmatrix} = \begin{bmatrix} p_{11} & y_1 \\ p_{12} & y_1 \\ p_{13} & y_1 \\ p_{14} & y_1 \end{bmatrix} \cdot \begin{bmatrix} x_1 \\ x_2 \end{bmatrix}$$ [Equation 12]

Referring to Equation 12, information mapped to the layer is x_1, x_2, and each element P_ij of the 4×2 matrix is weight used for precoding. y_1, y_2, y_3, and y_4 are information mapped to the antennas and may be transmitted through respective antennas using respective OFDM transmission methods.

The reception stage that has received the signal precoded and transmitted by the transmission stage may reconstruct the received signal by performing inverse processing of the precoding performed in the transmission stage. In general, the precoding matrix satisfies a unitary matrix U condition, such as U. U^H=I (wherein U^H means the Hermit matrix of the matrix U). The aforementioned inverse processing of the precoding may be performed using a method of multiplying the received signal by the Hermit matrix (P^H) of a precoding matrix P used for the precoding of the transmission stage.

Furthermore, in the precoding, performance of various antenna configurations needs to be taken into consideration in the codebook design because excellent performance is necessary for antenna configurations of various methods. Hereinafter, illustrative configurations of multiple antennas are described.

In the existing 3GPP LTE system (e.g., a system according to 3GPP LTE Release-8 or 9 standard), a codebook for 4 Tx antennas has been designed because a maximum of 4 Tx antennas are supported in the downlink. In the 3GPP LTE-A system, that is, the evolution of the existing 3GPP LTE, a maximum of 8 Tx antennas may be supported in the downlink. Accordingly, it is necessary to design a precoding codebook that provides excellent performance with respect to downlink transmission through a maximum of 8 Tx antennas.

Furthermore, in the codebook design, in general, it is necessary to provide excellent performance for a constant modulus property, an infinite alphabet, a limitation to a codebook size, a nested property, and various antenna configurations.

The constant modulus property means the property in which the amplitude of each channel component of a precoding matrix forming a codebook is constant. According to such a property, regardless of which precoding matrix is used, a power level transmitted by each of all of antenna may be constantly maintained. Accordingly, use efficiency of a power amplifier can be improved.

The finite alphabet means that precoding matrices are configured using only quadrature phase shift keying (QPSK) alphabets (i.e., ±1, ±j) other than a scaling factor in the case of 2 Tx antennas, for example. Accordingly, computational complexity can be reduced when a precoders multiplies precoding matrices.

The codebook size may be limited to a given size or less. As the size of a codebook increases, a channel state may be incorporated more precisely because precoding matrices for various cases are included. The reason for this is that the number of bits of a precoding matrix indicator (PMI) increases, which may cause signaling overhead.

The nested property means that some of high rank precoding matrices consist of a low rank precoding matrix. If the precoding matrix is configured as described above, proper performance can be guaranteed although a base station determines that downlink transmission is performed with a transmission rank lower than a channel rank appearing in a rank indicator (RI) reported by a UE. Furthermore, computational complexity of channel quality information (CQI) can also be reduced according to this property. The reason for this is that some of calculation for precoding matrix selection can be shared when an operation of selecting a precoding matrix from precoding matrices designed with respect to different ranks is performed.

To provide excellent performance for various antenna configurations means that it is necessary to provide performance of a given criterion or more to various cases, such as an antenna configuration having a low correlation, an antenna configuration having a high correlation or a cross-polarization antenna configuration.

Reference Signal (RS)

In a wireless communication system, since data is transmitted through a radio channel, a signal may be distorted during transmission. In order for the receiving end to accurately receive the distorted signal, the distortion of the received signal needs to be corrected using channel information. In order to detect the channel information, a signal transmitting method known to both the transmitter side and the receiver side and a method for detecting the channel information using the degree of distortion when the signal is transmitted through the channel are primarily used. The aforementioned signal is referred to as a pilot signal or a reference signal (RS).

Recently, when packets are transmitted in most mobile communication systems, multiple transmission antennas and multiple reception antennas are adopted to increase data transmission/reception efficiency, unlike the related art using a single transmission antenna and a single reception antenna. In transmission and reception of data using multiple input/output antennas, the channel states between transmission antennas and reception antennas should be detected in order to accurately receive signals. Accordingly, each transmission antenna needs to have an individual reference signal.

In a wireless communication system, RSs can be largely classified into two types according to its purpose. The RSs include an RS for channel information acquisition and RSs for data demodulation. The former is used for acquisition of channel information to downlink by a UE. Thus, the former RS needs to be transmitted in a wideband, and even a UE that does not receive downlink data in a specific subframe needs to receive and measure the RS. In addition, this RS is also used for measurement for mobility management (RRM) such as handover. The latter is an RS that is transmitted together with corresponding resource when a base station transmits downlink data. In this regard, the UE can receive the corresponding RS to estimate the channel and accordingly demodulate data. This RS needs to be transmitted in a region in which data is transmitted.

Downlink reference signals include a common RS (CRS) for acquiring information on channel states shared by all terminals within a cell and measuring handover, etc. and a dedicated RS used for data modulation for a specific terminal. Using these reference signals, information for demodulation and channel measurement may be provided. That is, the DRS is used only for data demodulation, while the CRS is used for two purposes including channel information acquisition and data demodulation.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as a UE-specific RS or a demodulation RS (DMRS).

Figure 8:
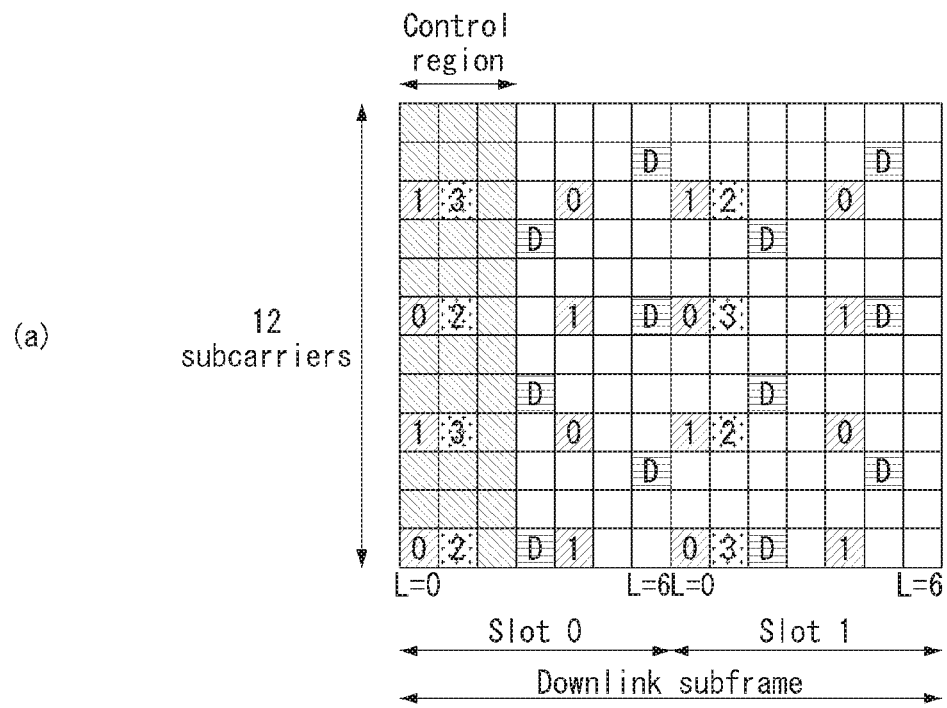
FIG. 8 illustrates reference signal patterns mapped to a downlink resource block pairs in a wireless communication system to which the present invention may be applied.
Figure 8:
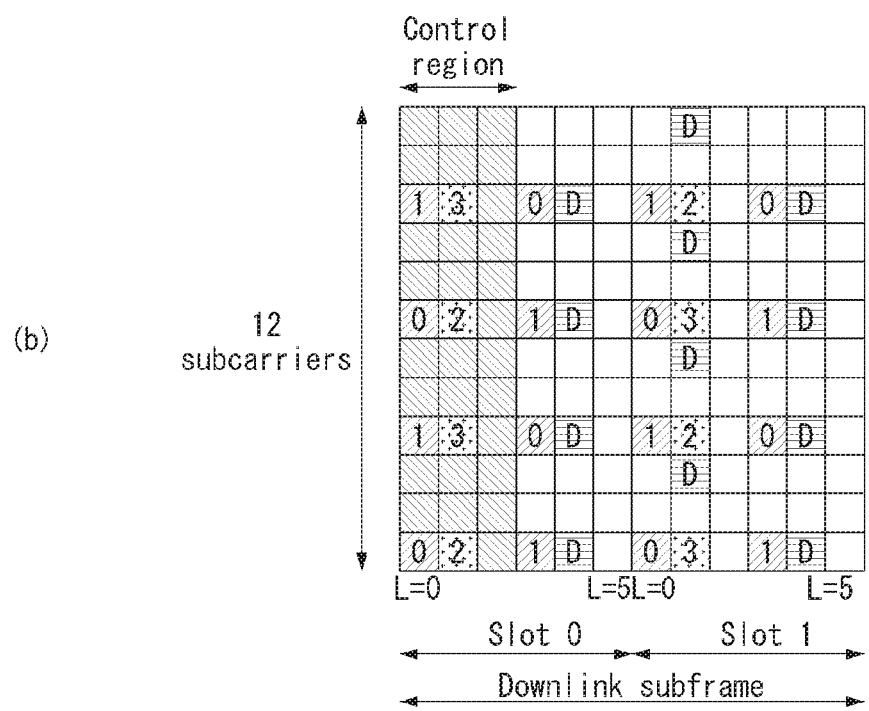

FIG. 8 illustrates a reference signal pattern mapped to a downlink resource block pair in the wireless communication system to which an embodiment of the present invention may be applied.

Referring to FIG. 8, as a unit by which a reference signal is mapped, a downlink resource block pair may be represented by one subframe in the time domain x 12 subcarriers in the frequency domain. In other words, one resource block pair on the time axis (x-axis) has a length of 14 OFDM symbols in the case of a normal CP (Cyclic Prefix) (in the case of FIG. 8(a)) and has a length of 12 OFDM symbols in the case of an extended CP (in the case of FIG. 8(b)). In the resource block grids, the resource elements (REs) denoted by '0', '1', '2', and '3' indicate the CRS positions of antennas with indices of '0', '1', '2', and '3', respectively; and the resource elements denoted by 'D' indicate DRS positions.

Hereinafter, a CRS is described more specifically. The CRS is a reference signal that is used to estimate the channel of a physical antenna and may be received by all of UEs located within a cell in common, and is distributed to a full frequency band. That is, the CRS is a cell-specific signal and is transmitted every subframe with respect to a wideband. Furthermore, the CRS may be used for channel quality information (CSI) and data demodulation.

The CRS is defined in various formats depending on an antenna array in a Tx side (base station). In the 3GPP LTE system (e.g., Release-8), an RS for a maximum of 4 antenna ports is transmitted depending on the number of Tx antennas of a base station. The downlink signal Tx side has three types of antenna arrays, such as a single Tx antenna, 2 Tx antennas and 4 Tx antennas. For example, if the number of Tx antennas of a base station is two, CRSs for Nos. 0 and 1 antenna ports are transmitted. If the number of Tx antennas of a base station is four, CRSs for Nos. 0-3 antenna ports are transmitted respectively. If the number of Tx antennas of a base station is four, CRS patterns in one RB are shown in FIG. 8.

If a base station uses a single Tx antenna, reference signals for a single antenna port is arrayed.

If a base station uses 2 Tx antennas, reference signals for 2 Tx antenna ports are arrayed using a time division multiplexing (TDM) and/or frequency division multiplexing (FDM) method. That is, different time resources and/or different frequency resources are allocated so that the reference signals for the 2 antenna ports are distinguished.

Moreover, if a base station uses 4 Tx antennas, reference signals for 4 Tx antenna ports are arrayed using the TDM and/or FDM method. Channel information measured by the Rx side (UE) of a downlink signal may be used to demodulate transmitted data using a transmission method, such as single Tx antenna transmission, transmit diversity, closed-loop spatial multiplexing, open-loop spatial multiplexing or multi-user MIMO.

If multiple input/output antennas are supported, when a reference signal is transmitted from a specific antenna port, the reference signal is transmitted at the location of specific resource elements according to a pattern of the reference signal, and is not transmitted at the location of specific resource elements for different antenna ports. That is, reference signals between different antennas do not overlap.

A DRS is described below more specifically. The DRS is used to demodulate data. In multiple input/output antenna transmission, precoding weight used for a specific UE is used to estimate a corresponding channel without a change in combination with a transmission channel transmitted in each Tx antenna with the UE receives a reference signal.

The 3GPP LTE system (e.g., Release-8) supports a maximum of 4 Tx antennas, and a DRS for rank 1 beamforming is defined in the 3GPP LTE system. The DRS for rank 1 beamforming also indicates a reference signal for an antenna port index 5.

An LTE-A system, that is, an evolved form of the LTE system, needs to be designed to support a maximum of 8 Tx antennas in the downlink of a base station. Accordingly, an RS for a maximum of 8 Tx antennas must be also supported. In the LTE system, a downlink RS for a maximum of 4 antenna ports has been defined. Accordingly, if a base station has 4 or more to a maximum of 8 downlink Tx antennas in the LTE-A system, an RS for such antenna ports must be additionally defined and designed. In the RS for a maximum of 8 Tx antenna ports, both the aforementioned RS for channel measurement and the aforementioned RS for data demodulation must be designed.

One of important factors considered in designing the LTE-A system is backward compatibility, that is, that an LTE UE must well operate in the LTE-A system and the system must also support this. From an RS transmission viewpoint, in the time-frequency domain in which a CRS defined in LTE is transmitted every subframe in a full band, an RS for a maximum of 8 Tx antenna ports must be additionally defined. In the LTE-A system, RS overhead excessively increases if an RS pattern for a maximum of 8 Tx antennas is added to a full band every subframe using the same method as a CRS in the existing LTE.

Accordingly, an RS newly designed in the LTE-A system is basically divided into two types, including an RS (channel state information-RS, channel state indication-RS (CSI-RS)) of a channel measurement object for the selection of an MCS, a PMI, etc. and an RS (data demodulation-RS (DM-RS)) for data demodulation which is transmitted in 8 Tx antennas.

Unlike the existing CRS used for data demodulation simultaneously with objects, such as channel measurement and the measurement of handover, the CSI-RS of the channel measurement object is characterized in that it is designed for an object focused on channel measurement. The CSI-RS of the channel measurement object may also be used for an object, such as the measurement of handover. Since the CSI-RS is transmitted for only an object of obtaining information about a channel state, it does not need to be transmitted every subframe unlike a CRS. In order to reduce overhead of the CSI-RS, the CSI-RS is intermittently transmitted on a time axis.

For data demodulation, a DM-RS is dedicatedly transmitted to a UE scheduled in a corresponding time-frequency domain. That is, the DM-RS of a specific UE is transmitted in the region in which the corresponding UE has been scheduled, that is, only in the time-frequency domain in which data is received.

The LTE-A system supports a maximum of 8 Tx antennas in the downlink of a base station. In the LTE-A system, if an RS for a maximum of 8 Tx antennas is transmitted in a full band every subframe using the same method as the CRS of the existing LTE, RS overhead excessively increases. Accordingly, in the LTE-A system, the CSI-RS of a CSI measurement object for the selection of an MCS, a PMI, etc. and a DM-RS for data demodulation are separated and the two RSs have been added. The CSI-RS may be used for an object for RRM measurement, but has been designed for a main object of obtaining CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS may be periodically transmitted with a period, that is, a positive number times one subframe or may be transmitted in a specific transmission pattern. In this case, the period or pattern in which the CSI-RS is transmitted may be configured by an eNB.

For data demodulation, a DM-RS is dedicatedly transmitted to a UE scheduled in a corresponding time-frequency domain. That is, the DM-RS of a specific UE is transmitted in the region in which the corresponding UE has been scheduled, that is, only in the time-frequency domain in which data is received.

In order to measure a CSI-RS, a UE must be aware of information about the transmission subframe index of a CSI-RS for each of the CSI-RS antenna ports of a cell to which the UE belongs, a CSI-RS resource element (RE) time-frequency location within a transmission subframe, and a CSI-RS sequence.

In the LTE-A system, an eNB must transmit a CSI-RS with respect to each of a maximum of 8 antenna ports. Resources used for the CSI-RS transmission of different antenna ports must be orthogonal to each other. When one eNB transmits CSI-RSs for different antenna ports, it may allocate such resources orthogonally according to an FDM/TDM scheme by mapping the CSI-RSs for the respective antenna ports to different REs. Alternatively, the eNB may transmit CSI-RSs for different antenna ports using a CDM method of mapping the CSI-RSs to orthogonal codes.

When an eNB notifies its cell UE of information about a CSI-RS, first, the eNB must notify the cell UE of information about a time-frequency to which a CSI-RS for each antenna port is mapped. Specifically, the information includes subframe numbers in which a CSI-RS is transmitted, the period in which the CSI-RS is transmitted, a subframe offset in which the CSI-RS is transmitted, an OFDM symbol number in which the CSI-RS RE of a specific antenna is transmitted, frequency spacing, an offset or shift value of an RE in the frequency axis.

A CSI-RS is transmitted through 1, 2, 4 or 8 antenna ports. The antenna ports used in this case are p=15, p=15, 16, p=15, ..., 18, and p=15, ..., 22. The CSI-RS may be defined with respect to only subcarrier spacing $\Delta f=15$ kHz.

A CSI-RS sequence is mapped to a complex-valued modulation symbol $(a\_k,l^(p))$ used as a reference symbol on each antenna port (p) within a subframe configured for CSI-RS transmission, as in Equation 13.

$$a_{k,l}^{(p)} = w_{l''} \cdot r_{l,n_s}(m') \qquad \text{[Equation 13]}$$

$$k = k' + 12m + \begin{cases} -0 & \text{for } p \in \{15,16\}, \text{ normal cyclic prefix} \\ -6 & \text{for } p \in \{17,18\}, \text{ normal cyclic prefix} \\ -1 & \text{for } p \in \{19,20\}, \text{ normal cyclic prefix} \\ -7 & \text{for } p \in \{21,22\}, \text{ normal cyclic prefix} \\ -0 & \text{for } p \in \{15,16\}, \text{ extended cyclic prefix} \\ -3 & \text{for } p \in \{17,18\}, \text{ extended cyclic prefix} \\ -6 & \text{for } p \in \{19,20\}, \text{ extended cyclic prefix} \\ -9 & \text{for } p \in \{21,22\}, \text{ extended cyclic prefix} \end{cases}$$

$$l = l' + \begin{cases} l'' & \text{CSI reference signal configuration 0-19, normal cyclic prefix} \\ 2l'' & \text{CSI reference signal configuration 20-31, normal cyclic prefix} \\ l'' & \text{CSI reference signal configuration 0-27, extended cyclic prefix} \end{cases}$$

$$w_{l''} = \begin{cases} 1 & p \in \{15,17,19,21\} \\ (-1)^{l''} & p \in \{16,18,20,22\} \end{cases}$$

$$l'' = 0,1$$

$$m = 0,1, \ldots, N_{RB}^{DL} - 1$$

$$m' = m + \left\lfloor \frac{N_{RB}^{max,DL} - N_{RB}^{DL}}{2} \right\rfloor$$

In Equation 13, the condition of (k',l') (wherein k' is a subcarrier index within a resource block and l' indicates an OFDM symbol index within a slot.) and n_s is determined based on CSI-RS configurations, such as Table 3 or Table 4.

Table 3 illustrates the mapping of (k',l') from CSI-RS configurations in a normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |

TABLE 3-continued

| | CSI reference signal configuration | Number of CSI reference signals configured | | | | | |
|---|---|---|---|---|---|---|---|
| | | 1 or 2 | | 4 | | 8 | |
| | | (k', l') | n_s mod 2 | (k', l') | n_s mod 2 | (k', l') | n_s mod 2 |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 illustrates the mapping of (k',l') from CSI-RS configurations in an extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | n_s mod 2 | (k', l') | n_s mod 2 | (k', l') | n_s mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, different configurations of a maximum of 32 (in the case of a normal CP) or a maximum of 28 (in the case of an extended CP) are defined.

The CSI-RS configuration is different depending on the number of antenna ports within a cell and a CP. A neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined based on the CSI-RS configurations according to Table 3 and Table 4, and a time-frequency resource used for CSI-RS transmission is determined based on each CSI-RS antenna port.

Figure 9:
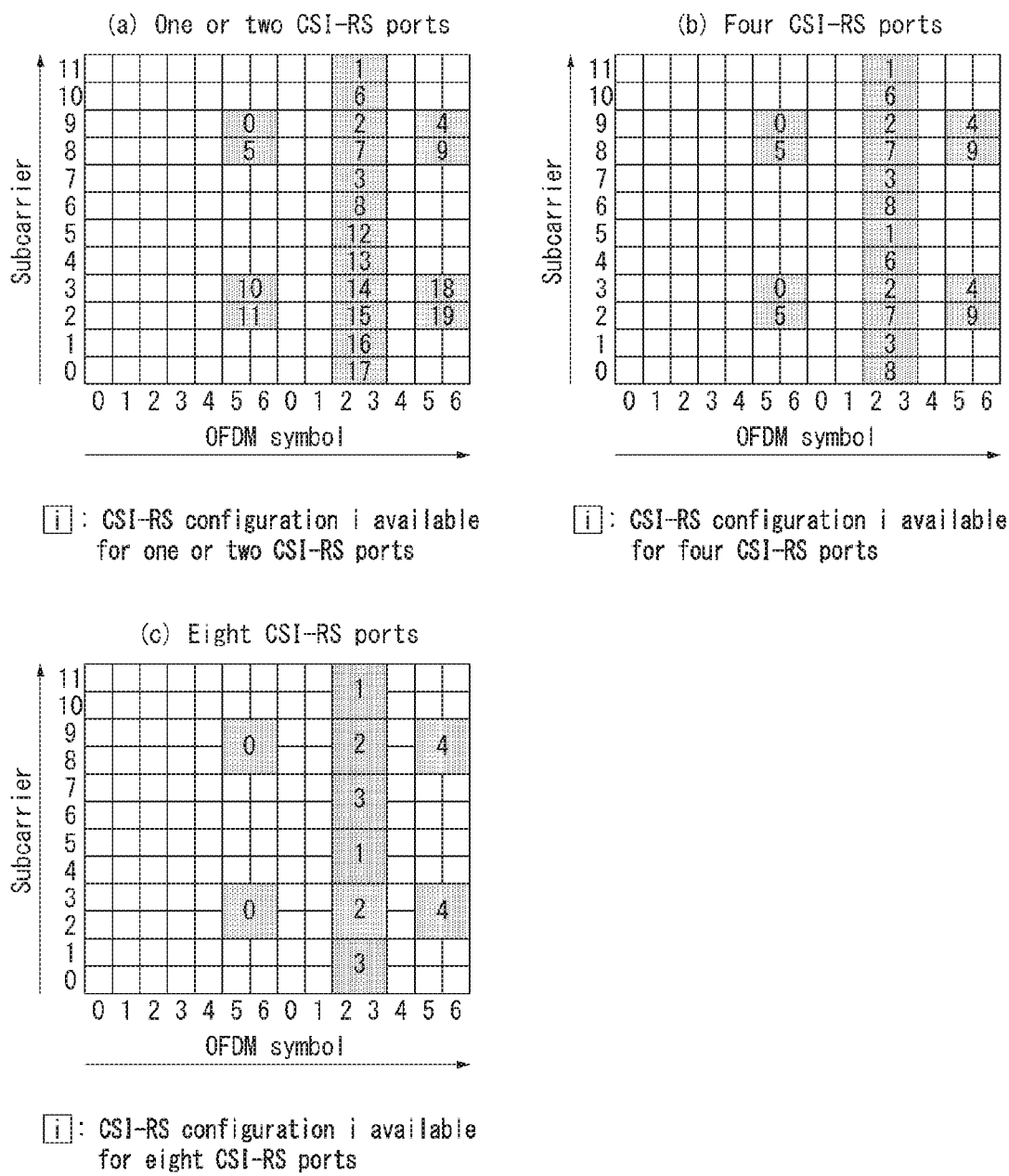
FIG. 9 is a diagram illustrating resources to which reference signals are mapped in a wireless communication system to which the present invention may be applied

FIG. 9 is a diagram illustrating resources to which reference signals are mapped in a wireless communication system to which the present invention may be applied.

FIG. 9(a) shows 20 CSI-RS configurations available for CSI-RS transmission based on 1 or 2 CSI-RS antenna ports. FIG. 9(b) shows 10 CSI-RS configurations available for 4 CSI-RS antenna ports. FIG. 9(c) shows 5 CSI-RS configurations available for CSI-RS transmission based on 8 CSI-RS antenna ports.

As described above, a radio resource (i.e., RE pair) in which a CSI-RS is transmitted according to each CSI-RS configuration is determined.

When 1 or 2 antenna ports are configured for CSI-RS transmission with respect to a specific cell, the CSI-RS is transmitted on a radio resource according to a configured CSI-RS configuration of the 20 CSI-RS configurations shown in FIG. 9(a).

Likewise, when 4 antenna ports are configured for CSI-RS transmission with respect to a specific cell, the CSI-RS is transmitted on a radio resource according to a configured CSI-RS configuration of the 10 CSI-RS configurations shown in FIG. 9(b). Furthermore, when 8 antenna ports are configured for CSI-RS transmission with respect to a specific cell, the CSI-RS is transmitted on a radio resource according to a configured CSI-RS configuration of the 5 CSI-RS configurations shown in FIG. 9(c).

A CSI-RS for each antenna port is CDMed to the same radio resource every two antenna ports (i.e., {15,16}, {17, 18}, {19,20}, {21,22}) and is transmitted. For example, in the case of the antenna ports 15 and 16, CSI-RS complex symbols for the respective antenna ports 15 and 16 are the same, but are multiplied by different orthogonal codes (e.g., Walsh code) and mapped to the same radio resource. The complex symbol of the CSI-RS for the antenna port 15 is multiplied by [1, 1], and the complex symbol of the CSI-RS for the antenna port 16 is multiplied by [1 −1] and mapped to the same radio resource. The same is true of the antenna ports {17,18}, {19,20}, {21,22}.

A UE may detect a CSI-RS for a specific antenna port by multiplying a transmitted symbol by a multiplied code. That is, the transmitted symbol is multiplied by the multiplied code [1 1] in order to detect the CSI-RS for the antenna port 15 and by the multiplied code [1 −1] in order to detect the CSI-RS for the antenna port 16.

Referring to FIGS. 9(a) to 9(c), in the case of the same CSI-RS configuration index, a radio resource according to a CSI-RS configuration having a large number of antenna ports includes a radio resource according to a CSI-RS configuration a small number of CSI-RS antenna ports. For example, in the case of a CSI-RS configuration 0, a radio resource for 8 antenna ports includes both a radio resource for 4 antenna ports and a radio resource for 1 or 2 antenna ports.

A plurality of CSI-RS configurations may be used in one cell. Only 0 or 1 CSI-RS configuration may be used for a non-zero power (NZP) CSI-RS, and 0 or several CSI-RS configurations may be used for a zero power (ZP) CSI-RS.

A UE assumes zero transmit power in REs (other than a case where they overlap an RE assuming a NZP CSI-RS configured by a higher layer) corresponding to the 4 CSI-RS columns Table 3 and Table 4 for each bit set to 1 in a ZP CSI-RS (ZeroPowerCSI-RS), that is, a bitmap of 16 bits configured by a higher layer. The most significant bit (MSB) correspond to the lowest CSI-RS configuration index, and next bits within the bitmap correspond to a next CSI-RS configuration index sequentially.

A CSI-RS is transmitted only in a downlink slot satisfying the condition of (n_s mod 2) in Table 3 and Table 4 and a subframe satisfying a CSI-RS subframe configuration.

In the case of a frame structure type 2 (TDD), a CSI-RS is not transmitted in a special subframe, a synchronization signal (SS), a subframe that collides against PBCH or SIB 1 (SystemInformationBlockType1) message transmission or a subframe configured for paging message transmission.

Furthermore, an RE in which a CSI-RS for any antenna port belonging to antenna port sets S (S={15}, S={15,16}, S={17,18}, S={19,20} or S={21,22}) is transmitted is not used for a PDSCH or the CSI-RS transmission of other antenna ports.

Time-frequency resources used for CSI-RS transmission cannot be used for data transmission. Accordingly, data throughput is decreased as CSI-RS overhead increases. By taking into consideration such contents, a CSI-RS is not configured to be transmitted every subframe, but is configured to be transmitted in each given transmission period corresponding to multiple subframes. In this case, CSI-RS transmission overhead can be reduced compared to a case where a CSI-RS is transmitted every subframe.

A subframe period (hereinafter referred to as a "CSI transmission period") (T_CSI-RS) and a subframe offset ($\Delta$_CSI-RS) for CSI-RS transmission are shown in Table 5.

Table 5 illustrates a CSI-RS subframe configuration.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, the CSI-RS transmission period (T_CSI-RS) and the subframe offset (A_CSI-RS) are determined based on the CSI-RS subframe configuration (I_CSI-RS). The CSI-RS subframe configuration of Table 5 may be configured as one of the "SubframeConfig" field and the "zeroTxPowerSubframeConfig" field. The CSI-RS subframe configuration may be separately configured with respect to the NZP CSI-RS and the ZP CSI-RS.

A subframe including a CSI-RS satisfies Equation 14 below.

$$(10n_f + \lfloor n_s/2 \rfloor - \Delta_{CSI-RS}) \bmod T_{CSI-RS} = 0 \quad \text{[Equation 14]}$$

In Equation 14, T_CSI-RS means a CSI-RS transmission period, A_CSI-RS means a subframe offset value, n_f means a system frame number, and n_s means a slot number.

In the case of a UE in which the transmission mode 9 has been configured with respect to a serving cell, one CSI-RS resource configuration may be configured for the UE. In the case of a UE in which the transmission mode 10 has been configured with respect to a serving cell, one or more CSI-RS resource configuration(s) may be configured for the UE.

In the current LTE standard, a CSI-RS configuration may include the number of antenna ports (antennaPortsCount), a subframe configuration (subframeConfig), a resource configuration (resourceConfig), etc., and provides notification that a CSI-RS is transmitted in how many antenna ports, the period and offset of a subframe in which a CSI-RS will be transmitted, and that a CSI-RS is transmitted in which RE location (i.e., frequency and OFDM symbol index) in a corresponding subframe.

Specifically, the following parameters for each CSI-RS (resource) configuration are configured through higher layer signaling.

- a CSI-RS resource configuration identifier if the transmission mode 10 is configured,
- a CSI-RS port number (antennaPortsCount): a parameter (e.g., 1 CSI-RS ports, 2 CSI-RS ports, 4 CSI-RS ports, 8 CSI-RS ports) representing the number of antenna ports used for CSI-RS transmission
- a CSI-RS configuration (resourceConfig) (Table 3 and Table 4 reference): a parameter regarding a CSI-RS allocation resource location a CSI-RS subframe configuration (subframeConfig, that is, I_CSI-RS) (Table 5 reference): a parameter regarding a subframe period and/or an offset in which a CSI-RS will be transmitted if the transmission mode 9 has been configured, transmit power (P_C) for CSI feedback: in relation to the assumption of a UE for reference PDSCH transmission power for feedback, when the UE derives CSI feedback and takes a value within a [−8, 15] dB range in a 1 dB step size, P_C is assumed to be a ratio of energy per resource element (EPRE) per PDSCH RE and a CSI-RS EPRE.

if the transmission mode 10 has been configured, transmit power (P_C) for CSI feedback with respect to each CSI process. When CSI subframe sets C_CSI,0 and C_CSI,1 are configured by a higher layer with respect to a CSI process, P_C is configured for each CSI subframe set of the CSI process.

a pseudo-random sequence generator parameter (n_ID)

if the transmission mode 10 has been configured, a higher layer parameter ("qcl-CRS-Info-r11") including a QCL scrambling identifier (qcl-ScramblingIdentity-r11) for a QuasiCo-Located (QCL) type B UE assumption, CRS port count (crs-PortsCount-r11), and MBSFN subframe configuration list (mbsfn-SubframeConfigList-r11) parameters When a CSI feedback value derived by a UE has a value within the [−8, 15] dB range, P_C is assumed to be a ratio of PDSCH EPRE to CSI-RS EPRE. In this case, the PDSCH EPRE corresponds to a symbol in which the ratio of PDSCH EPRE to CRS EPRE is $\rho\_A$.

Both a CSI-RS and a PMCH are not configured in the same subframe of a serving cell.

In the frame structure type 2, if 4 CRS antenna ports are configured, a CSI-RS configuration index belonging to the [20-31] sets (refer to Table 3) in the case of a normal CP or the [16-27] sets (refer to Table 4) in the case of an extended CP are not configured in a UE.

A UE may assume that the CSI-RS antenna ports of a CSI-RS resource configuration have a QCL relation with respect to delay spread, Doppler spread, a Doppler shift, an average gain and average delay.

A UE in which the transmission mode 10 and the QCL type B have been configured may assume that the antenna ports 0-3 corresponding to a CSI-RS resource configuration and the antenna ports 15-22 corresponding to a CSI-RS resource configuration have a QCL relation with respect to Doppler spread and a Doppler shift.

In the case of a UE in which the transmission mode 1-9 has been configured, one ZP CSI-RS resource configuration may be configured in the UE with respect to a serving cell. In the case of a UE in which the transmission mode 10 has been configured, one or more ZP CSI-RS resource configurations may be configured in the UE with respect to a serving cell.

The following parameters for a ZP CSI-RS resource configuration may be configured through higher layer signaling.

a ZP CSI-RS configuration list (zeroTxPowerResourceConfigList) (refer to Table 3 and Table 4): a parameter regarding a zero-power CSI-RS configuration a ZP CSI-RS subframe configuration (eroTxPowerSubframeConfig, that is, I_CSI-RS) (refer to Table 5): a parameter regarding a subframe period and/or an offset in which a zero-power CSI-RS is transmitted A ZP CSI-RS and a PMCH 가 are not configured at the same time in the same subframe of a serving cell.

In the case of a UE in which the transmission mode 10 has been configured, one or more channel state information-interference measurement (CSI-IM) resource configurations may be configured with respect to a serving cell.

The following parameters for each CSI-IM resource configuration may be configured through higher layer signaling.

a ZP CSI-RS configuration (refer to Table 3 and Table 4)

a ZP CSI RS subframe configuration (I_CSI-RS) (refer to Table 5)

A CSI-IM resource configuration is identical with any one of configured ZP CSI-RS resource configurations.

A CSI-IM resource and a PMCH are not configured at the same time in the same subframe of a serving cell.

Massive MIMO

Multiple-input multiple-output (MIMO) systems with a large number of antennas, often called massive MIMO, have received much attention as a means to improve the spectral efficiency, energy efficiency, and processing complexity.

In 3GPP, a discussion has been recently initiated regarding massive MIMO systems in order to meet the requirements of spectral efficiency of future mobile communication systems. Massive MIMO is also called Full-Dimension MIMO (FD-MIMO).

In a wireless communication system after LTE Release (Rel)-12, the introduction of an active antenna system (AAS) is taken into consideration.

Unlike in an existing passive antenna system in which an amplifier and an antenna in which the phase and size of a signal can be adjusted have been separated, the AAS means a system in which each antenna is configured to include an active element, such as an amplifier.

The AAS does not require a separate cable, a connector, and other hardware for connecting an amplifier and an antenna depending on use of an active antenna and thus has high efficiency in terms of energy and an operation cost. In particular, the AAS enables an advanced MIMO technology, such as the forming of an accurate beam pattern or 3-dimensional beam pattern in which beam direction and beam width are taken into consideration, because the AAS supports an electronic beam control method for each antenna.

Due to the introduction of an advanced antenna system, such as the AAS, a massive MIMO structure including a plurality of input/output antennas and a multi-dimensional antenna structure is also taken into consideration. For example, as opposed to the existing straight-line antenna array, if a 2-D (2-dimension) antenna array is formed, a 3-dimensional beam pattern may be formed by the active antenna of the AAS.

Figure 10:
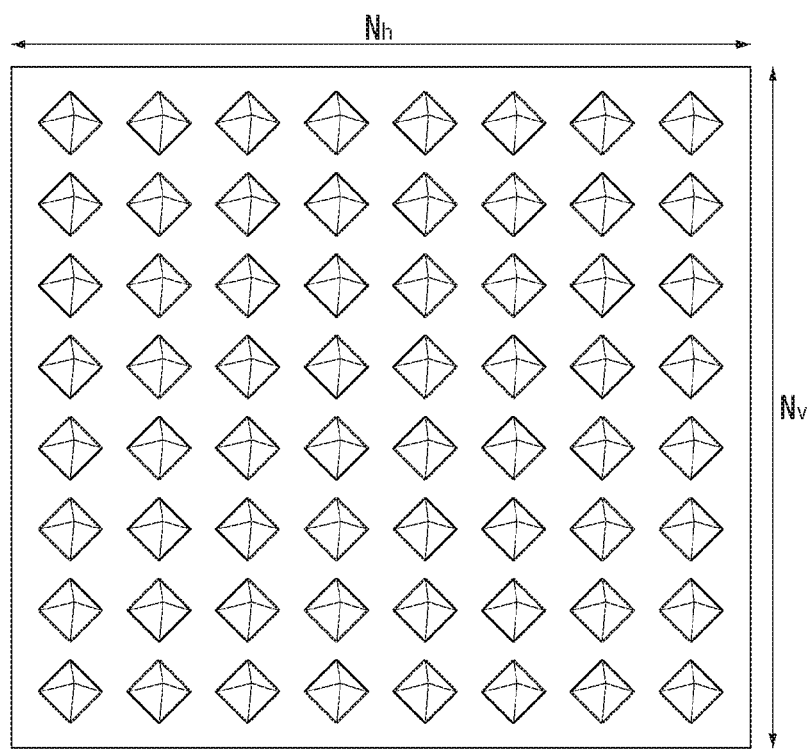
FIG. 10 illustrates a 2-dimensional active antenna system having 64 antenna elements in a wireless communication system to which the present invention may be applied.

FIG. 10 illustrates a 2-dimensional active antenna system having 64 antenna elements, in a wireless communication system to which the present invention may be applied.

FIG. 10 illustrates a general 2D (2-dimension) antenna array, and N_t=N_v*N_h antennas may have a square shape as in FIG. 10. Here, N_h denotes the number of antenna columns in a horizontal direction, and N_v denotes the number of antenna rows in a vertical direction.

Using such an antenna array with a 2D structure, radio waves may be controlled both in a vertical direction (elevation) and a horizontal direction (azimuth) so as to control transmission beams on a three-dimensional space.

Figure 11:
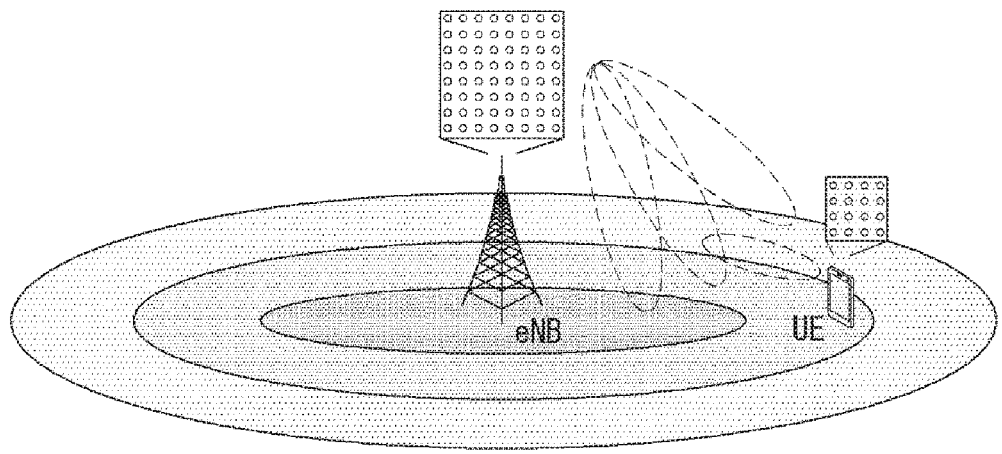
FIG. 11 illustrates a system that a base station or user equipment has a plurality of transmission/reception antennas capable of forming an AAS-based 3-dimension (3D) beam in a wireless communication system to which the present invention may be applied.

FIG. 11 illustrates a system that a base station or terminal has a plurality of transmission/reception antennas capable of forming an AAS-based 3D (3-Dimension) beam, in a wireless communication system to which the present invention may be applied.

FIG. 11 is a schematic view of the aforementioned example, which illustrates a 3D-MIMO system utilizing a 2-dimensional antenna array (i.e., 2D-AAS).

If the 3D beam pattern is used from the viewpoint of a transmission antenna, semi-static or dynamic beamforming not only in a horizontal direction of a beam but also in a vertical direction may be performed and, for example, applications such as sectorization of a vertical direction may be considered.

In addition, from the viewpoint of a reception antenna, when a received beam is formed using a massive reception antenna, signal power may be increased according to antenna array gain. Accordingly, in uplink, the base station may receive a signal from the UE via a plurality of antennas. At this time, the UE may set its transmit power very low in consideration of gain of a massive reception antenna in order to reduce interference.

Figure 12:
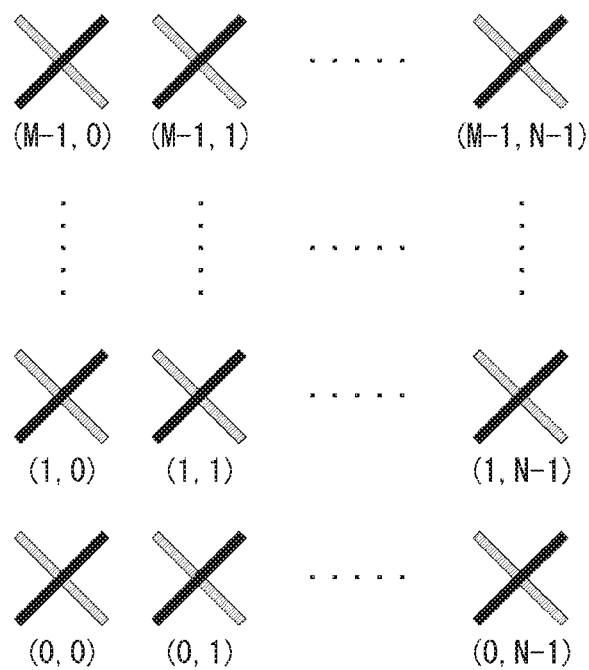
FIG. 12 illustrates a two-dimensional antenna system with cross polarization in a wireless communication system to which the present invention may be applied.

FIG. 12 illustrates a 2-dimensional (2D) antenna system having cross polarization (x-pol) in a wireless communication system to which the present invention may be applied.

A 2D planar array antenna model in which polarization is taken into consideration may be diagrammed as in FIG. 12.

Unlike in the existing MIMO system according to a passive antenna, in a system based on an active antenna, the gain of an antenna element may be dynamically adjusted by applying weight to an active element (e.g., amplifier) attached to (or included in) each antenna element. A radiation pattern depends on an antenna arrangement, such as the number of antenna elements and antenna spacing, and thus an antenna system may be modeled in an antenna element level.

An antenna array model, such as the example of FIG. 12, may be represent as (M, N, P), which corresponds to a parameter that characterizes an antenna array structure.

M indicates the number of antenna elements having the same polarization in each column (i.e., in a vertical direction) (i.e., the number of antenna elements having a +45° slant in each column or the number of antenna elements having a −45° slant in each column).

N indicates the number of column in a horizontal direction (i.e., the number of antenna elements in the horizontal direction).

P indicates the number of dimensions of polarization. As in FIG. 12, P=2 in the case of cross polarization (x-pol), but P=1 in the case of co-polarization.

An antenna port may be mapped to a physical antenna element. An antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross polarization antenna element is used for downlink MIMO or downlink transmission diversity. For example, the antenna port 0 may be mapped to one physical antenna element, whereas the antenna port 1 may be mapped to another physical antenna element. In this case, in a UE standpoint, 2 downlink transmissions are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, downlink transmission may be directed toward a specific UE by using multiple physical antenna elements. In general, this may be achieved using an antenna array including multiple columns of multiple cross polarization antenna elements. In this case, in a UE standpoint, a single downlink transmission generated from a single antenna port is present. One may be related to a CRS for the antenna port 0, and the other is related to a CRS for the antenna port 1.

That is, the antenna port indicates downlink transmission in a UE standpoint not actual downlink transmission from a physical antenna element in a base station.

For another example, multiple antenna ports are used for downlink transmission, but each antenna port may be mapped to multiple physical antenna elements. This may correspond to a case where an antenna array is used for downlink MIMO or downlink diversity. For example, the antenna ports 0 and 1 may be mapped respective multi-physical antenna elements. In this case, in a UE standpoint, 2 downlink transmissions are present. One is related to a reference signal for the antenna port 0, and the other is related to a reference signal for the antenna port 1.

In FD-MIMO, the MIMO precoding of a data stream may experience antenna port virtualization, transceiver unit (or transmission and reception unit (TXRU)) virtualization, and an antenna element pattern.

In the antenna port virtualization, a stream on an antenna port is precoded on the TXRU. In the TXRU virtualization, a TXRU signal is precoded on an antenna element. In the antenna element pattern, a signal radiated from an antenna element may have a directional gain pattern.

In the existing transceiver modeling, static one-to-one mapping between an antenna port and the TXRU is assumed. A TXRU virtualization effect is merged as a static (TXRU) antenna pattern, including both the effects of the TXRU virtualization and the antenna element pattern.

The antenna port virtualization may be performed according to a frequency-selective method. In LTE, an antenna port is defined along with a reference signal (or pilot). For example, for data transmission precoded on an antenna port, a DMRS is transmitted in the same bandwidth as a data signal, and both a DMRS and data are precoded by the same precoder (or the same TXRU virtualization precoding). For CSI measurement, a CSI-RS is transmitted through multiple antenna ports. In CSI-RS transmission, the precoder that characterizes mapping between a CSI-RS port and the TXRU so that a UE can estimate a TXRU virtualization precoding matrix for a data precoding vector may be designed as a unique matrix.

In a TXRU virtualization method, 1D TXRU virtualization and 2D TXRU virtualization are discussed, and this is described with reference to the following drawing.

Figure 13:
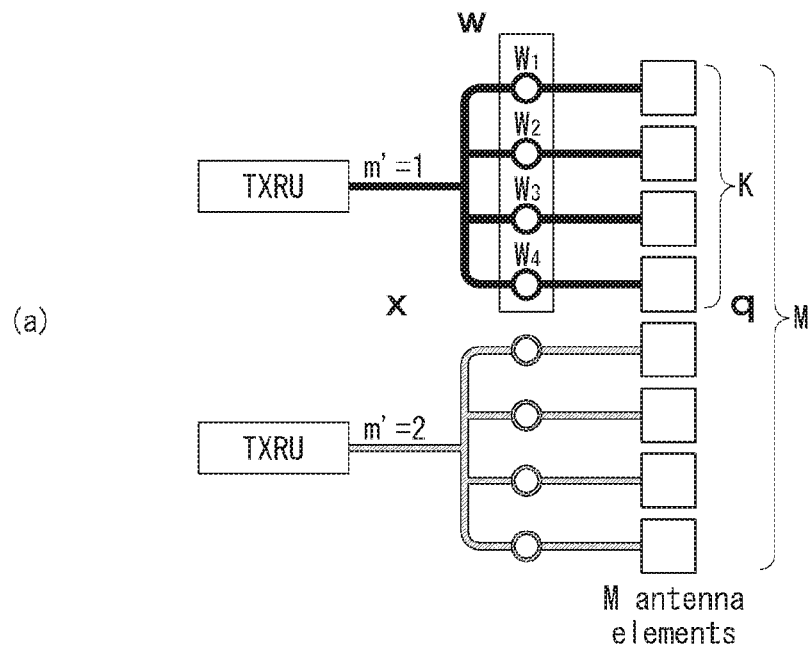
FIG. 13 illustrates a transceiver unit model in a wireless communication system to which the present invention may be applied.
Figure 13:
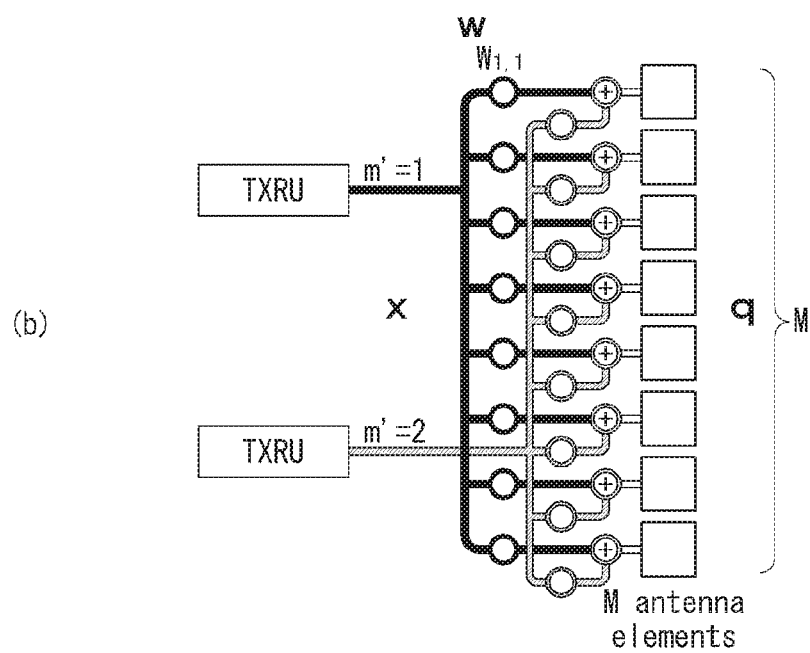

FIG. 13 illustrates a transceiver unit model in a wireless communication system to which the present invention may be applied.

In 1D TXRU virtualization, the M_TXRU TXRU is related to M antenna elements configured as a single column antenna array having the same polarization.

In 2D TXRU virtualization, a TXRU model configuration corresponding to the antenna array model configuration (M, N, P) of FIG. 12 may indicate (M_TXRU, N, P). In this case, M_TXRU means the number of TXRU present in the same 2D column and same polarization, and always satisfies M_TXRU≤M. That is, a total number of TXRUs is the same as M_TXRU×N×P.

A TXRU virtualization model may be divided into a TXRU virtualization model option-1: a sub-array partition model as in FIG. 13(a) and a TXRU virtualization model option-2: full-connection model as in FIG. 13(b) depending on a correlation relation between an antenna element and a TXRU.

Referring to FIG. 13(a), in the case of the sub-array partition model, an antenna element is partitioned into multiple antenna element groups, and each TXRU is connected to one of the groups.

Referring to FIG. 13(b), in the case of the full-connection model, the signals of multiple TXRUs are combined and delivered to a single antenna element (or an array of antenna elements).

In FIG. 13, q is a transmission signal vector of antenna elements having the same M co-polarization within one column. W is a wideband TXRU virtualization weight vector, and W is a wideband TXRU virtualization weight matrix. X is the signal vector of M_TXRU TXRUs.

In this case, mapping between an antenna port and TXRUs may be 1-to-1 or 1-to-many.

In FIG. 13, mapping between a TXRU and an antenna element (TXRU-to-element mapping) is merely an example, and the present invention is not limited thereto. In a hardware viewpoint, the present invention may be identically applied to mapping between a TXRU and an antenna element that may be implemented in various forms.

Precoding Matrix Indicator (PMI) Definition

In the case of the transmission modes 4, 5 and 6, precoding feedback is used for channel-dependent codebook-based precoding, and depends on a UE(s) that reports a PMI. In the case of the transmission mode 8, a UE reports a PMI. In the case of the transmission modes 9 and 10, if a PMI/RI report are configured and a CSI-RS port is greater than 1, a UE reports a PMI. The UE reports the PMI based on a feedback mode. In the case of other transmission modes, a PMI report is not supported.

In the case of 2 antenna ports, each PMI value corresponds to Table 6 below and a codebook index.

If 2 antenna ports are {0,1} or {15,16} and a related RI value is 1, a PMI value corresponds to a codebook index n when $v=_1$ in Table 6 ($n \in \{0,1,2,3\}$))

If 2 antenna ports are {0,1} or {15,16} and a related RI value is 2, a PMI value corresponds to a codebook index n+1 when $v=_2$ in Table 6 ($n \in \{0,1\}$).

Table 6 illustrates a codebook for transmission on the antenna ports {0,1} and for CSI reporting based on the antenna ports {0,1} or {15,16}.

TABLE 6

| Codebook index | Number of layers ($v$) | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | — |

If 4 antenna ports are {0,1,2,3} or {15,16,17,18}, each PMI value corresponding to the codebook index given in Table 7 as follows or corresponds to a pair of codebook indices given Table 8 to Table 11.

A PMI value may correspond to a codebook index n given in Table 7 with respect to v identical with an associated RI value ($n \in \{0,1, \ldots, 15\}$)

Alternatively, each PMI value may correspond to a pair of codebook indices given in Table 8 to Table 11. In this case, in Table 8 and Table $\varphi_n$, $\varphi'_n$ and $v'_m$, are the same as Equation 15 below.

$$\varphi_n = e^{j\pi n/2}$$

$$\varphi'_n = e^{j2\pi n/32}$$

$$v'_m = [1\ e^{j2\pi n/32}]^T \quad \text{[Equation 15]}$$

A first PMI value ($i_e \in \{0,1, \ldots, f(v)-1\}$) and a second PMI value ($i_2 \in \{0,1, \ldots, g(v)-1\}$) correspond to codebook indices $i_1$ and $i_2$ given in Table j with respect to v identical with an associated RI value. In this case, when $v=\{1,2,3,4\}f(v)=\{16,16,1,1\}$ and $g(v)=\{16,16,16,16\}$, j corresponds to 8, 9, 10, 11.

In Table 10 and Table 11, $W_n^{\{s\}}$ indicates a matrix defined by columns given by the set {s} from $W_n = I - 2u_n u_n^H / u_n^H u_n$. In this case, I is a 4×4 unit matrix, and the vector U n is determined in Table 7. Furthermore, $n=i_2$.

According to circumstances, codebook subsampling is supported.

Table 7 illustrates a codebook for transmission on the antenna ports {0,1,2,3} and for CSI reporting based on the antenna ports {0,1,2,3} or {15,16,17,18}.

TABLE 7

| Codebook index | $u_n$ | Number of layers (v) | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j\sqrt{2})]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j\sqrt{2})]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j\sqrt{2})]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j\sqrt{2})]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |

TABLE 7-continued

| Codebook index | $u_n$ | Number of layers (v) | | | |
|---|---|---|---|---|---|
| | | 1 | 2 | 3 | 4 |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Table 8 illustrates a codebook for 1-layer CSI reporting using the antenna ports 0 to 3 or 15 to 18.

TABLE 8

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{i_1,0}^{(1)}$ | $W_{i_1,8}^{(1)}$ | $W_{i_1,16}^{(1)}$ | $W_{i_1,24}^{(1)}$ | $W_{i_1+8,2}^{(1)}$ | $W_{i_1+8,10}^{(1)}$ | $W_{i_1+8,18}^{(1)}$ | $W_{i_1+8,26}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{i_1+16,4}^{(1)}$ | $W_{i_1+16,12}^{(1)}$ | $W_{i_1+16,20}^{(1)}$ | $W_{i_1+16,28}^{(1)}$ | $W_{i_1+24,6}^{(1)}$ | $W_{i_1+24,14}^{(1)}$ | $W_{i_1+24,22}^{(1)}$ | $W_{i_1+24,30}^{(1)}$ |

$$W_{m,n}^{(1)} = \frac{1}{2}\begin{bmatrix} v'_m \\ \varphi'_n v'_m \end{bmatrix}$$

Table 9 illustrates a codebook for 2-layer CSI reporting using the antenna ports 0 to 3 or 15 to 18.

TABLE 9

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | $i_2$ | | | |
|---|---|---|---|---|
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | $i_2$ | | | |
|---|---|---|---|---|
| | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| $i_1$ | $i_2$ | | | |
|---|---|---|---|---|
| | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

$$W_{m,m',n}^{(2)} = \frac{1}{\sqrt{8}}\begin{bmatrix} v'_m & v'_{m'} \\ \varphi_n v'_{m'} & -\varphi_n v'_{m'} \end{bmatrix}$$

Table 10 illustrates a codebook for 3-layer CSI reporting using the antenna ports 15 to 18.

TABLE 10

| | $i_2$ | | | | | | | |
|---|---|---|---|---|---|---|---|---|
| $i_1$ | 0 | 1 | 2 | 3 | 4 | 5 | 6 | 7 |
| 0 | $W_0^{\{124\}}/\sqrt{3}$ | $W_1^{\{123\}}/\sqrt{3}$ | $W_2^{\{123\}}/\sqrt{3}$ | $W_3^{\{123\}}/\sqrt{3}$ | $W_4^{\{124\}}/\sqrt{3}$ | $W_5^{\{124\}}/\sqrt{3}$ | $W_6^{\{134\}}/\sqrt{3}$ | $W_7^{\{134\}}/\sqrt{3}$ |

| | $i_2$ | | | | | | | |
|---|---|---|---|---|---|---|---|---|
| $i_1$ | 8 | 9 | 10 | 11 | 12 | 13 | 14 | 15 |
| 0 | $W_8^{\{124\}}/\sqrt{3}$ | $W_9^{\{134\}}/\sqrt{3}$ | $W_{10}^{\{123\}}/\sqrt{3}$ | $W_{11}^{\{134\}}/\sqrt{3}$ | $W_{12}^{\{123\}}/\sqrt{3}$ | $W_{13}^{\{123\}}/\sqrt{3}$ | $W_{14}^{\{123\}}/\sqrt{3}$ | $W_{15}^{\{123\}}/\sqrt{3}$ |

Table 11 illustrates a codebook for 4-layer CSI reporting using the antenna ports 15 to 18.

TABLE 11

| | $i_2$ | | | | | | | |
|---|---|---|---|---|---|---|---|---|
| $i_1$ | 0 | 1 | 2 | 3 | 4 | 5 | 6 | 7 |
| 0 | $W_0^{\{1234\}}/2$ | $W_1^{\{1234\}}/2$ | $W_2^{\{3214\}}/2$ | $W_3^{\{3214\}}/2$ | $W_4^{\{1234\}}/2$ | $W_5^{\{1234\}}/2$ | $W_6^{\{1324\}}/2$ | $W_7^{\{1324\}}/2$ |

| | $i_2$ | | | | | | | |
|---|---|---|---|---|---|---|---|---|
| $i_1$ | 8 | 9 | 10 | 11 | 12 | 13 | 14 | 15 |
| 0 | $W_8^{\{1234\}}/2$ | $W_9^{\{1234\}}/2$ | $W_{10}^{\{1324\}}/2$ | $W_{11}^{\{1324\}}/2$ | $W_{12}^{\{1234\}}/2$ | $W_{13}^{\{1324\}}/2$ | $W_{14}^{\{3214\}}/2$ | $W_{15}^{\{1234\}}/2$ |

In the case of 8 antenna ports, each PMI value corresponds to a pair of codebook indices given in Table 12 to Table 19. In this case, $\varphi_n$ and $v_m$ are the same as Equation 16 below.

$$\varphi_n = e^{j\pi n/2}$$
$$v_m = [1\ e^{j2\pi n/32}\ e^{j4\pi n/32}\ e^{j6\pi n/32}]^T \quad \text{[Equation 16]}$$

In the case of 8 antenna ports, {15,16,17,18,19,20,21,22}, a first PMI value ($i_1 \in \{0,1,\ldots,f(v)-1\}$) and a second PMI value ($i_2 \in \{0,1,\ldots,g(v)-1\}$) correspond to codebook indices $i_1$ and $i_2$ given in Table j with respect to v identical with an associated RI value. In this case, j=v, f(v)={16,16,4,4,4,4,4,1}, and g(v)={16,16,16,8,1,1,1,1}

According to circumstances, codebook subsampling is supported.

Table 12 illustrates a codebook for 1-layer CSI reporting using the antenna ports 15 to 22.

TABLE 12

| | $i_2$ | | | | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | $i_2$ | | | | | | | |
|---|---|---|---|---|---|---|---|---|
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |

$$W_{m,n}^{(1)} = \frac{1}{8}\begin{bmatrix} v_m \\ \varphi_n v_m \end{bmatrix}$$

Table 13 illustrates a codebook for 2-layer CSI reporting using the antenna ports 15 to 22.

TABLE 13

| | $i_2$ | | | |
|---|---|---|---|---|
| $i_1$ | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

TABLE 13-continued

| | $i_2$ | | | |
|---|---|---|---|---|
| $i_1$ | 4 | 5 | 6 | 7 |
| 0-15 | $W_{2i_1+1,2i_1+2,0}^{(2)}$ | $W_{2i_1+1,2i_1+2,1}^{(2)}$ | $W_{2i_1+3,2i_1+3,0}^{(2)}$ | $W_{2i_1+3,2i_1+3,1}^{(2)}$ |

| | $i_2$ | | | |
|---|---|---|---|---|
| $i_1$ | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| | $i_2$ | | | |
|---|---|---|---|---|
| $i_1$ | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ |

$$W_{m,m',n}^{(2)} = \frac{1}{4}\begin{bmatrix} v_m & v_{m'} \\ \varphi_n v_m & -\varphi_n v_{m'} \end{bmatrix}$$

Table 14 illustrates a codebook for 3-layer CSI reporting using the antenna ports 15 to 22.

TABLE 14

| | $i_2$ | | | |
|---|---|---|---|---|
| $i_1$ | 0 | 1 | 2 | 3 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ | $\tilde{W}_{8i_1+8,8i_1+8,8i_1}^{(3)}$ |

| | $i_2$ | | | |
|---|---|---|---|---|
| $i_1$ | 4 | 5 | 6 | 7 |
| 0-3 | $W_{8i_1+2,8i_1+2,8i_1+10}^{(3)}$ | $W_{8i_1+10,8i_1+2,8i_1+10}^{(3)}$ | $\tilde{W}_{8i_1+2,8i_1+10,8i_1+10}^{(3)}$ | $\tilde{W}_{8i_1+10,8i_1+2,8i_1+2}^{(3)}$ |

| | $i_2$ | | | |
|---|---|---|---|---|
| $i_1$ | 8 | 9 | 10 | 11 |
| 0-3 | $W_{8i_1+4,8i_1+4,8i_1+12}^{(3)}$ | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| | $i_2$ | | | |
|---|---|---|---|---|
| $i_1$ | 12 | 13 | 14 | 15 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ | $\tilde{W}_{8i_1+14,8i_1+6,8i_1+6}^{(3)}$ |

$$W_{m,m',m''}^{(3)} = \frac{1}{\sqrt{24}}\begin{bmatrix} v_m & v_{m'} & v_{m''} \\ v_m & -v_{m'} & -v_{m''} \end{bmatrix},$$

$$\tilde{W}_{m,m',m''}^{(3)} = \frac{1}{\sqrt{24}}\begin{bmatrix} v_m & v_{m'} & v_{m''} \\ v_m & v_{m'} & -v_{m''} \end{bmatrix}$$

Table 15 illustrates a codebook for 4-layer CSI reporting using the antenna ports 15 to 22.

TABLE 15

| $i_1$ | $i_2$ | | | |
|---|---|---|---|---|
| | 0 | 1 | 2 | 3 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(2)}$ |
| $i_1$ | $i_2$ | | | |
| | 4 | 5 | 6 | 7 |
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ |

$$W_{m,m',n}^{(4)} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$$

Table 16 illustrates a codebook for 5-layer CSI reporting using the antenna ports 15 to 22.

TABLE 16

| $i_1$ | $i_2$ |
|---|---|
| | 0 |
| 0-3 | $W_{i_1}^{(5)} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

Table 17 illustrates a codebook for 6-layer CSI reporting using the antenna ports 15 to 22.

TABLE 17

| $i_1$ | $i_2$ |
|---|---|
| | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

Table 18 illustrates a codebook for 7-layer CSI reporting using the antenna ports 15 to 22.

TABLE 18

| $i_1$ | $i_2$ |
|---|---|
| | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

Table 19 illustrates a codebook for 8-layer CSI reporting using the antenna ports 15 to 22.

TABLE 19

| $i_1$ | $i_2$ |
|---|---|
| | 0 |
| 0-3 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Codebook of Rel-13 System

A codebook of Rel-13 complies with the dual structure of Rel-10, Rel-12 codebook. That is, the final codebook is configured by the product of two parameters W1 and W2 with the properties of W1 (PMI having properties of long-term, wideband and beam group selection) and W2 (PMI having properties of short-term, subband and beam selection+co-phasing). A difference is that each beam configuring a codebook has a Kronecker product form of a vertical beam and a horizontal beam because an antenna port layout taken into consideration forms a 2D antenna array. An Rel-13 Rank 1-2 codebook is represented into Equation 1 as an equation.

$$W = W_1 W_2 \quad \text{[Equation 17]}$$

$$W^{(1)}_{m_1,m_2,n} = \frac{1}{\sqrt{2N_1 N_2}} \begin{bmatrix} v_{m_1} \otimes u_{m_2} \\ \varphi_n v_{m_1} \otimes u_{m_2} \end{bmatrix},$$

$$\varphi_n = \exp\left(\frac{j 2\pi n}{4}\right), n = 0, 1, 2, 3,$$

$$W^{(2)}_{m_1,m_2,n} =$$

$$\frac{1}{2\sqrt{N_1 N_2}} \begin{bmatrix} v_{m_1} \otimes u_{m_2} & v_{m_1} \otimes u_{m_2} \\ \varphi_n v_{m_1} \otimes u_{m_2} & -\varphi_n v_{m_1} \otimes u_{m_2} \end{bmatrix},$$

$$\varphi_n = \exp\left(\frac{j 2\pi n}{4}\right), n = 0, 1$$

$$v_{m_1} = \left[1 \; \exp\left(j \frac{2\pi m_1}{o_1 N_1}\right) \ldots \exp\left(j \frac{2\pi m_1 (N_1 - 1)}{o_1 N_1}\right)\right]^T$$

$$u_{m_2} = \left[1 \; \exp\left(j \frac{2\pi m_2}{o_2 N_2}\right) \ldots \exp\left(j \frac{2\pi m_2 (N_2 - 1)}{o_2 N_2}\right)\right]^T$$

In Equation 17, $N_1$ and $N_2$ indicate the number of antenna ports of a first dimension (dim) per polarization (pol) and the number of antenna ports of a second dimension (dim) per polarization (pol). $O_1$ and $O_2$ indicate oversampling factors in the first and the second dimensions (dim).

Figure 14:
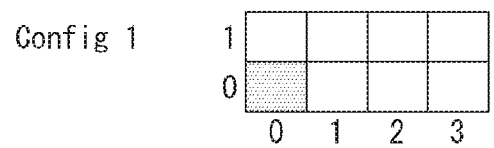
FIG. 14 shows beam group patterns according to codebook configurations (Config) to which the present invention may be applied.
Figure 14:
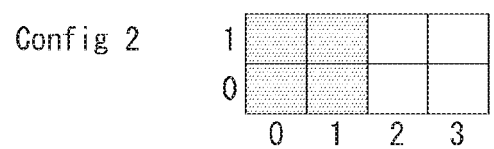
Figure 14:
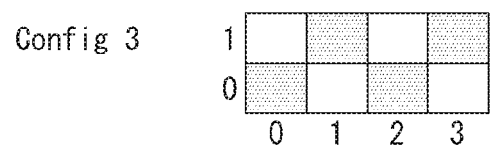
Figure 14:
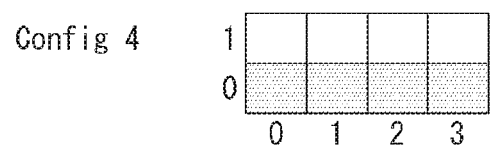

FIG. 14 shows beam group patterns according to codebook configurations (Config) to which the present invention may be applied.

Different beam group patterns of forms, such as FIG. 14, have been defined for each codebook configuration (Config), and have the following characteristics.

Extension of the 8Tx codebook of Rel-10 for the 2D of a Kronecker product form

Spacing between beams is close

Constant Modulus codebook

Scalable codebook having the parameters of $N_1$, $N_2$, $O_1$ and $O_2$

The codebook may be divided and defined as a total of four configurations (first (codebook) configuration (Config 1) to fourth (codebook) configuration (Config 4)). Each configuration has the following characteristics.

A. First (codebook) configuration (Config 1): if it does not have beam selection in W2

B. Second (codebook) configuration (Config 2): if it can be applied to medium angle spread in the second dimension C. Third (codebook) configuration (Config 3): if it can be applied to large angle spread and medium angle spread in the first and the second dimensions D. Fourth (codebook) configuration (Config 4): if it can be applied to large angle spread and small angle spread in the first and the second dimensions A performance difference between the first to the fourth (codebook) configurations is not great (within about 5%). Furthermore, a nested property between ranks is no longer applied and has a different beam pattern. In particular, in the case of Rank 1, the first codebook configuration includes only one beam, and the second to the fourth (codebook) configuration have different beam patterns including 4 selected beams in a beam group consisting of 2 by 4 beams. A codebook applicable to the 1D includes the first and the fourth (codebook) configurations.

Hybrid CSI Reporting Method

As full dimension (FD)-MIMO (or may be referred to as massive-MIMO, enhanced-MIMO, a large-scale antenna system, very large MIMO or hyper-MIMO) is introduced, a base station can improve throughput of a system by performing D-beamforming using N (N>>1) antenna ports (or they may correspond to "elements" depending on specific port-to-element virtualization, which are hereinafter collectively called "ports", for convenience of description).

In current 3GPP Rel-13, a CSI-RS operation (or CSI reporting operation) of a non-precoded scheme defined as Class A (each CSI process may be associated with one CSI-RS resource and one CSI-IM resource) and a CSI-RS operation (or CSI reporting operation) of a beamformed scheme defined as Class B (each CSI process may be associated with one or more CSI-RS resources and one or more CSI-IM resources) are defined.

In the case of Class A, in the FD MIMO system, a base station may configure several CSI-RS resources with respect to a UE in one CSI procedure. The UE assumes the CSI-RS resources configured within one CSI procedure as one large CSI-RS resource by merging the CSI-RS resources without considering each of the CSI-RS resources as an independent channel, calculates/obtain CSI from a corresponding resource, and feeds the results back to the base station. For example, if a base station has configured three 4-port CSI-RSs within one CSI procedure with respect to a UE, the UE assumes one 12-port CSI-RS resource by merging the configured three 4-port CSI-RS resources. The UE 8 calculates/obtains CSI from a corresponding resource using a 12-port PMI and fees the results back to the base station.

In the case of Class B, in the FD MIMO system, a base station may configure multiple CSI-RS resources within one CSI procedure with respect to a UE. For example, a base station may configure eight 4-port CSI-RSs resources within one CSI procedure with respect to a UE. As different virtualization is applied to each of the eight 4-port CSI-RSs, different beamforming may be applied. For example, assuming a case where vertical beamforming has been applied to a first CSI-RS at a zenith angle of 100 degrees, vertical beamforming may be applied to the second to eighth CSI-RSs with a zenith angle difference of 5 degrees. As a result, vertical beamforming may have been applied to a CSI-RS corresponding to the eighth at a zenith angle of 135 degrees.

In this case, the UE assumes each the configured CSI-RS resources as an independent channel, selects one of the configured CSI-RS resources, calculates/obtains CSI based on the selected resource, and feeds back/reports the CSI to the base station. That is, the UE may select a CSI-RS resource having a robust channel among the configured eight 4-port CSI-RSs resources, may calculate CSI based on the selected CSI-RS resource, and may report the CSI to the base station. In this case, the UE may report the selected CSI-RS resource to the base station through a CSI-RS resource index (CRI) value. For example, if the first CSI-RS resource channel is the strongest, the UE may set a CRI value to "0" and report it to the base station.

In order to effectively show the aforementioned characteristics, the following variables may be defined in a Class B CSI procedure. K may mean the number of CSI-RS resources present within the CSI process, and Nk may mean the number of CSI-RS ports of a k-th CSI-RS resource. For example, if eight 4-port CSI-RSs resources have been configured in a UE, K is 8, and Nk is 4 regardless of a k value.

In current Rel-13, a CRI indicates only a specific CSI-RS resource, but a future CRI may be further embodied to indicate a specific port combination in a specific CSI-RS. For example, the CRI may be further embodied to indicate one CSI-RS resource selected from 8 CSI-RS resources within a CSI procedure and to additionally indicate that the selected one CSI-RS resource consists of a combination of Nos. 15 and 16 ports. In this case, if the CRI can indicate a combination of Nos. 15 and 16 ports or a combination of Nos. 17 and 18 ports for each CSI-RS resource, the CRI may have any one of 16 (=2^4) values.

That is, the CRI may indicate a port combination for each CSI-RS in ascending order of CRI values in such a manner that the CRI indicates a combination of Nos. 15 and 16 ports of a first CSI-RS resource if CRI=0 is set, indicates a combination of Nos. 17 and 18 ports of the first CSI-RS resource if CRI=1 is set, indicates a combination of Nos. 15 and 16 ports of a second CSI-RS resource if CRI=2 is set, and indicates a combination of Nos. 17 and 18 ports of the second CSI-RS resource if CRI=3 is set. If CRI=15 is set finally, the CRI may be construed as indicating a combination of Nos. 17 and 18 ports of the last eighth CSI-RS resources.

In the case of Class A, a UE measures N antenna ports, selects an N-port precoder using the N antenna ports, and reports CSI (PMI, CQI, RI, etc.) related to the N-port precoder to a base station. However, as N increases, a CSI-RS for the channel measurement of a UE must also increase. As a result, feedback overhead increases because a codebook size related to the CSI-RS increases.

In contrast, Class B has an advantage in that it can be used without a great increase in the CSI-RS although the number of antenna ports of a base station increases because the number of CSI-RS ports is related to a maximum rank of a UE rather than the number of antenna ports of the base station. In this case, there is a disadvantage in that the robustness of beamforming may be weakened in the environment in which the mobility of a UE is high and the environment in which the beam of a base station is narrow because the base station must perform beam selection.

In order to supplement the disadvantages of the two schemes and to maximize the advantages of the two schemes, a hybrid CSI-RS-based scheme (or CSI reporting scheme) using a combination of Class A and Class B may be taken into consideration.

In this specification, what processes for two (or more) CSI reports are combined within a single CSI process configuration may be referred to as "hybrid CSI." That is, the hybrid CSI may mean a CSI reporting type including two (or more) CSI-RS configurations within a single CSI process.

In this case, the type of each CSI-RS configuration may be configured as any one of Class A and Class B. For example, when an RRC parameter "eMIMO-Type" is set as "non-precoded" with respect to a corresponding CSI-RS configuration, this may correspond to a CSI-RS configuration of Class A. When "eMIMO-Type" is set as "beamformed", this may correspond to a CSI-RS configuration of Class B.

That is, two CSI-RS configurations within a single CSI process may include a first CSI-RS configuration and a second CSI-RS configuration.

Figure 15:
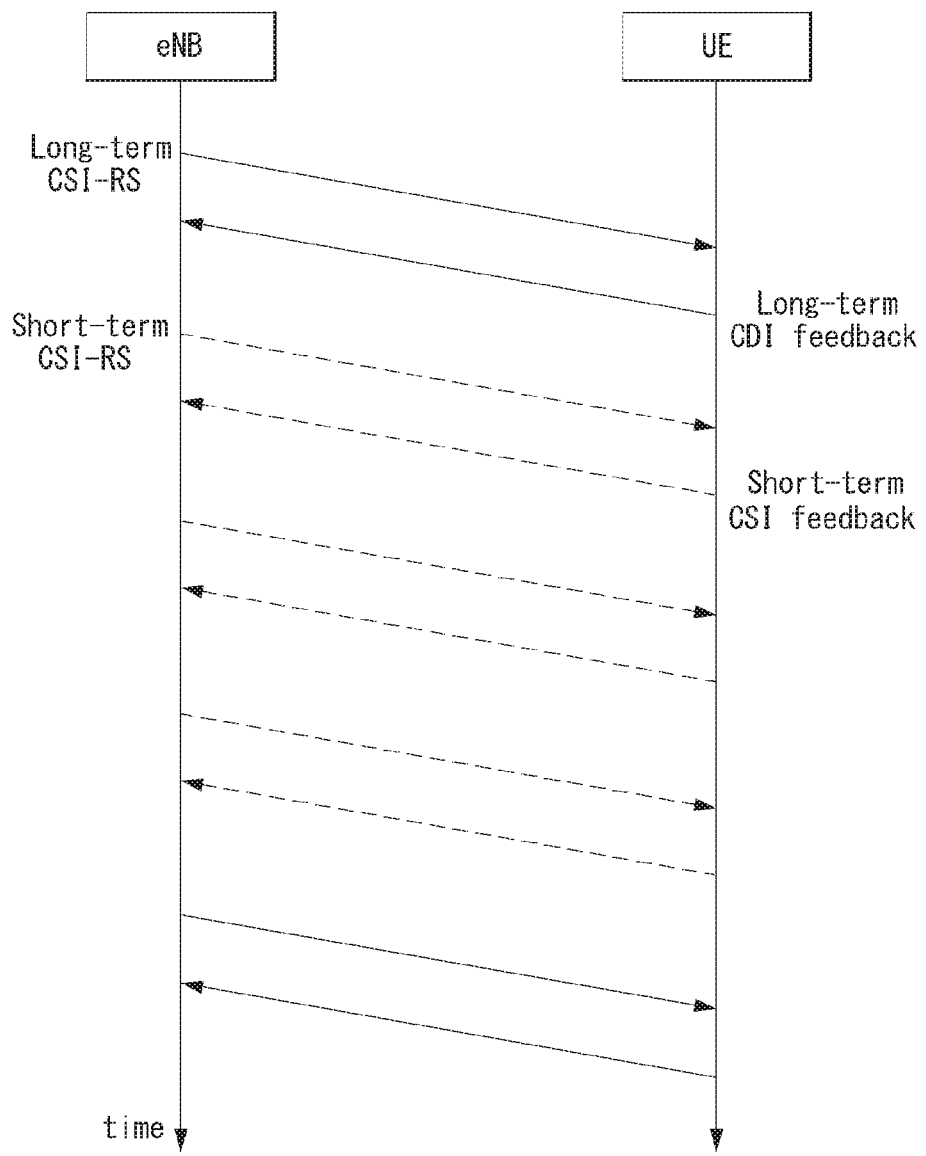
FIG. 15 is a diagram illustrating a hybrid CSI-RS-based scheme in a wireless communication system to which the present invention may be applied.

FIG. 15 is a diagram illustrating a hybrid CSI-RS-based scheme in a wireless communication system to which the present invention may be applied. In particular, FIG. 15 illustrates a hybrid CSI-RS-based scheme of Class A+Class B. In FIG. 15, a solid line has the period of a long term and indicates the CSI-RS transmission of an eNB and the feedback operation of a UE. A dotted line has the period of a short term (i.e., relatively shorter than a long-term CSI-RS) and indicates the CSI-RS transmission of the eNB and the feedback operation of the UE.

In the long-term CSI-RS, a CSI-RS based on Class A (i.e., the first CSI-RS configuration) is configured as Class A and is used to measure long-term channel direction information (CDI). The UE may report preferred CDI to the eNB using the long-term CSI-RS by taking into consideration its location and mobility. In this case, the CDI may include information of a horizontal domain and vertical domain in an integrated manner or independently.

In the case of the short-term CSI-RS (i.e., the second CSI-RS configuration), the eNB configures specific beamforming with respect to the UE using CSI obtained in a long term. Furthermore, the eNB notifies the UE of the specific beamforming using the short-term CSI-RS. The UE may feed beam selection, co-phasing and RI information back in a short term.

Hereinafter, an efficient signaling method in a hybrid CSI-RS-based scheme in which Class A and Class B are combined and a hybrid CSI-RS-based scheme in which Class B and Class B are combined is described. In this case, the following signaling method is not limitedly applied to only the hybrid CSI-RS-based scheme, but may be generalized and applied to a CSI-RS-based scheme to which one Class A/B is applied.

1. Hybrid CSI-RS-Based Scheme of Class a and Class B Combination

Hereinafter, there is proposed a signaling method necessary when the hybrid CSI-RS-based scheme of Class A, that is, a non-precoded CSI-RS-based scheme, and Class B, that is, a beamformed CSI-RS-based scheme, operates.

In this specification, Class A may include a case where the Rel-13 codebook defined in current Rel-13 is used and a case where the Rel-14 codebook newly defined in Rel-14 is used to support {20, 24, 28, 32} CSI-RS port in a form in which the Rel-13 codebook has been extended or modified. In this specification, a codebook used in Class A is referred to as a "Class A" codebook, for convenience of description.

In the case of the Rel-13 codebook, a UE receives N1, N2, O1 and O2, that is, codebook parameters, and a codebook configuration (Codebook Config) through higher layer signaling from a base station, and supports a 2D and/or 1D antenna port layout. In the case of the 1D antenna port layout, only Codebook Config 1 and Codebook Config 4 may be used. Furthermore, N1 and N2 indicate the number of antenna ports of the first and the second domains in respective antenna port layouts. O1 and O2 indicate oversampling factors applied to the respective domains.

Channel information (precoding matrix indicator (PMI), rank indicator (RI) and/or channel quality indicator (CQI)) of a UE through Class A CSI reporting may be fed back in the following form.

In the Class A CSI reporting for a hybrid CSI report, CQI feedback may not be taken into consideration because channel direction information of a UE is important. A PMI may be divided into a case where only a single PMI most preferred by a UE is fed back/reported and a case where multiple PMIs are fed back/reported. An RI may be divided into a case where it is fed back/reported by a UE and a case where it is not fed back/reported by a UE. If an RS is not reported, the RI may be limited to "1" (i.e., rank 1 is assumed).

Hereinafter, a signaling method in the Class A CSI reporting for hybrid CSI reporting of a UE is described more specifically.

A. Single PMI and RI

A UE selects the most preferred PMI and RI based on the antenna port layouts (N1, N2) configured through higher layer signaling, oversampling factors (O1, O2) and/or a Class A codebook (or CSI configuration information) corresponding to a codebook configuration (Codebook Config), and reports/feeds them back to a base station.

A-1. First Codebook Configuration

In the case of the first codebook configuration, a beam group of W1 consists of one beam. In the case of Rank 1, a PMI index (or the index of W1) (i1) is set as any one number within a range of 0 to (N1*O1*N2*O2−1), and it does not overlap between beam groups. In this specification, "Rank 1" may be construed that an RI is set 1, a rank value is one, or the number of transmission layers is one. In this case, a UE may report/feed the most preferred RI and a PMI index i1, corresponding to/associated with the corresponding RI, to/back to a base station. Alternatively, the UE may assume Rank 1 (RI=1 or the number of transmission layers=1) and report the most preferred PMI index (or the index of W1), but may report the R1 to the base station independently of the PMI. The RI reported by the UE through Class A may be used for beamforming vector generation, scheduling, etc. when the base station performs a Class B operation. Furthermore, beams of a transmission layer number or less indicated by the RI may be used when the base station performs the Class B operation.

A-2. Second to Fourth Codebook Configurations

In the case of the second to fourth codebook configurations, a beam group of W1 may consist of multiple beams. In the case of Rank 1, 4 beams arranged in different patterns may be selected from a beam group including 2 by 4 beams according to the second to fourth codebook configurations (refer to FIG. 15). In this case, in the case of the third and fourth codebook configurations, two identical beams overlap/are redundant between beam groups specified by neighboring PMIs. In this case, a UE may report, to a base station, the most preferred PMI and an RI corresponding to/associated with the most preferred PMI. In this specification, the RI corresponding to/associated with/appropriate for the PMI may indicate an RI (or a transmission layer number) that is assumed/basis for generating/deriving the PMI. Alternatively, the UE reports a PMI index i1 corresponding to (or obtained assuming Rank 1) Rank 1, but may report it independently/separately from the RI. The RI reported by the UE through Class A may be used for beamforming vector generation, scheduling, etc. when the base station performs a Class B operation. Furthermore, beams of a transmission layer number or less indicated by the RI may be used when the base station performs the Class B operation.

In the case of the third and fourth codebook configurations, two identical beams overlap/are redundant between beam groups specified by adjacent PMIs (indices) (particularly, W1). Accordingly, in the case of the third and fourth codebook configurations, a UE must be defined to feed back a preferred beam group index with respect to only a specific non-overlap/redundant beam group, such as that i1 is limited to be reported as an even number or an odd number, thereby being capable of reducing feedback overhead.

In the aforementioned embodiments, in order to solve problems, such as beam overlap/redundancy, in the hybrid CSI-based scheme in which Class A and Class B have been combined, limitations may be applied so that only the first codebook configuration (and/or the second codebook configuration) is used when Class A CSI is reported.

In the aforementioned embodiments, a UE may additionally feed codebook configuration information, regarding whether Class A CSI is reported using (or based on) which codebook configuration, back to a base station. That is, the base station does not separately indicate a codebook configuration with respect to the UE through RRC signaling (or configure/indicate a specific codebook configuration (e.g., an x-th codebook configuration (e.g., x=1)) with respect to a UE as a default codebook configuration). The UE may directly select a codebook configuration having many preferred beams from the first to fourth codebook configurations and feed it back to the base station.

Such a feedback operation of codebook configuration information may be defined as a new CSI reporting type within a (hybrid) CSI chain/procedure (and/or may be joint-encoded with the existing CSI reporting type) and may be defined/configured/triggered so that it is performed in a separate different UL transmission procedure. That is, in other words, the codebook configuration information may be defined as a new CSI reporting type or may be joint-encoded with a legacy report type and fed back to the base station within one (hybrid) CSI chain/procedure. Alternatively, the codebook configuration information may be fed back to the base station in an UL transmission procedure difference from a hybrid CSI chain/procedure. In this case, the codebook configuration information may be construed as being reported to the base station independently of CSI or being joint-encoded with the CSI and reported to the base station. The second to fourth codebook configurations include a beam group including the first codebook configuration. Accordingly, there is an advantage in that the feedback operation of codebook configuration information according to the present embodiment may adaptively apply beamforming based on horizontal and vertical angle spread.

The feedback operation of codebook configuration information may be associated with a hybrid CSI chain/procedure and operate therewith, and may be identically applied to a non-hybrid chain/procedure (i.e., when CSI of one class type is reported within one CSI procedure). For example, if only CSI of Class A (or Class B) type has been configured to be reported within one CSI procedure, a base station may not signal to a UE for codebook configuration information. The UE may directly feed back, to the base station, that CSI of Class A (or Class B) type (i.e., codebook configuration information) is reported using (or based on) which codebook configuration.

B. Multiple PMI and RI

A UE selects a plurality of (preferred) PMIs and at least one RI based on antenna port layouts (N1, N2) configured through higher layer signaling, oversampling factors (O1, O2) and/or a Class A codebook (or CSI configuration information) corresponding to a codebook configuration (Codebook Config), and reports/feeds them back to a base station.

B-1. First Codebook Configuration

In the first codebook configuration, when a UE reports a plurality of PMIs, the UE may select the best m (m>0) PMIs using metric, such as a channel quality indicator (CQI) and/or a signal-to-noise ratio (SINR), and may report them to a base station. In this case, the "best" may be used as the meaning of the best performance based on metric, such as a CQI and/or an SINR, and may be used as the same meaning as "preferred". Furthermore, "worst" has a meaning opposite "best" and may be used as the meaning of the worst performance. That is, a UE may select a preset number of PMIs based on performance of a PMI, and may feed/report it back to a base station as CSI.

In this case, a definition/configuration may be performed so that one RI corresponding to/associated with a plurality of PMIs (or best m PMIs) is also reported or one RI that may be applied to a plurality of PMIs (or best m PMIs) in common is reported. In this case, the base station assumes that the reported PMI corresponds to/is associated with reported one common RI (when performing a Class B CSI-RS transmission), and performs beamforming. The RI reported by the UE through Class A may be used for beamforming vector generation, scheduling, etc. when the base station performs a Class B operation. Furthermore, beams of a transmission layer number or less indicated by the RI may be used when the base station performs a Class B operation.

Alternatively, RIs corresponding to/associated with m PMIs, respectively (one-to-one), may be reported. In this case, a network may perform scheduling and beamforming with full flexibility.

For another example, a UE selects best m PMIs from PMIs corresponding to Rank 1 using metric, such as a CQI or an SINR, and reports them to a base station, but may report one RI to the base station independently of such PMIs. In this case, the RI reported to the base station may indicate an RI applied to the best m PMIs in common.

The RI reported by the UE through Class A may be used for beamforming vector generation, scheduling, etc. when the base station performs a Class B operation. Furthermore, beams of a transmission layer number or less indicated by the RI may be used when the base station performs a Class B operation.

For another example, a UE may select one best PMI and an RI corresponding to the one best PMI. Furthermore, the UE may additionally select worst PMI (and/or second best PMI, third best PMI, . . . , etc.) and report it to a base station. The worst PMI (and/or the second best PMI, the third best PMI, . . . , etc.) is used for the MU scheduling of the base station, thereby being capable of improving MU performance.

B-2. Second to Fourth Codebook Configurations

In the case of the second to fourth codebook configurations, a beam group of W1 may consist of multiple beams. In the case of Rank 1, 4 beams arranged in different patterns may be selected from a beam group having 2 by 4 beams according to the second to fourth codebook configurations (refer to FIG. 15). In this case, a UE may report multiple PMI indices derived based on the second, the third or the fourth codebook configuration, may select best m (m>0) PMIs using metric, such as a CQI and/or an SINR, and may report them to a base station. In this case, one RI corresponding to the m best PMIs may be additionally reported to the base station. The base station may assume that the reported PMI corresponds to/is associated with reported one RI, and may perform beamforming. Alternatively, the UE may report RIs, corresponding to/associated with the m best PMIs, respectively (one-to-one), to the base station. In this case, a network may perform scheduling and beamforming with full flexibility.

In the present embodiment, in the case of the third and fourth codebook configurations, two identical beams overlap/are redundant between beam groups specified by adjacent PMIs (indices) (particularly, W1). Accordingly, in the case of the third and fourth codebook configurations, a UE must be defined to feed back a preferred beam group index with respect to a specific non-overlap/redundant beam group only, such as that i1 is limited to be reported as only an even number or an odd number, thereby being capable of reducing feedback overhead.

For another example, a UE may select best m PMIs from PMIs corresponding to Rank 1 using metric, such as a CQI or an SINR and report them to a base station, but may report one RI to the base station independently of such PMIs. In this case, the RI reported to the base station may indicate an RI applied to the best m PMIs in common. The RI reported by the UE through Class A may be used for beamforming vector generation, scheduling, etc. when the base station performs a Class B operation. Furthermore, beams of a transmission layer number or less indicated by the RI may be used when the base station performs a Class B operation.

In the present embodiment, in the case of the third and fourth codebook configurations, two identical beams overlap/are redundant between beam groups specified by adjacent PMIs (indices) (particularly, W1). Accordingly, in the case of the third and fourth codebook configurations, a UE must be defined to feed back a preferred beam group index with respect to a specific non-overlap/redundant beam group only, such as that i1 is limited to be reported as only an even number or an odd number, thereby being capable of reducing feedback overhead.

For another example, a UE may select one best PMI and an RI corresponding to the one best PMI. Furthermore, the UE may additionally select worst PMI (and/or second best PMI, third best PMI, . . . , etc.) and report it to a base station. The worst PMI (and/or the second best PMI, the third best PMI, . . . , etc.) may be used for the MU scheduling of the base station, thereby being capable of improving MU performance.

In the aforementioned embodiments, in order to solve problems, such as beam overlap/redundancy, in a hybrid CSI-based scheme in which Class A and Class B have been combined, only the first codebook configuration (and/or the second codebook configuration) may be limited to be used when Class A CSI is reported.

In the aforementioned embodiments, a UE may additionally feed back, to a base station, codebook configuration information regarding that Class A CSI is reported using (or based on) which codebook configuration. That is, the base station does not separately indicate a codebook configuration with respect to the UE through RRC signaling (or configure/indicate a specific codebook configuration (e.g., an x-th codebook configuration (e.g., x=1)) as a default codebook configuration with respect to the UE). The UE may directly select a codebook configuration having many preferred beams from the first to fourth codebook configurations, and may feed it back to the base station.

Such a feedback operation of codebook configuration information may be defined as a new CSI reporting type within a (hybrid) CSI chain/procedure (and/or may be joint-encoded with the existing CSI reporting type) or may be defined/configured/triggered so that it is separately performed in a different UL transmission procedure. The second to fourth codebook configurations include a beam group including the first codebook configuration. Accordingly, the codebook configuration information feedback operation according to the present embodiment has an advantage in that it can adaptively apply beamforming according to horizontal and vertical angle spread.

The feedback operation of codebook configuration information may be associated with a hybrid CSI chain/procedure and operate therewith, and may be identically applied to a non-hybrid chain/procedure (i.e., when CSI of one class type is reported within one CSI procedure). For example, if only CSI of Class A (or Class B) type has been configured to be reported within one CSI procedure, a base station may not signal to a UE for codebook configuration information. The UE may directly feed back to the base station that CSI of Class A (or Class B) type (i.e., codebook configuration information) is reported using (or based on) which codebook configuration.

C. Single PMI

A UE selects the most (preferred) one PMI assuming Rank 1 based on antenna port layouts (N1, N2) configured through higher layer signaling, oversampling factors (O1, O2) and/or a Class A codebook (or CSI configuration information) corresponding to a codebook configuration (Codebook Config), and reports/feeds it back to a base station.

In the case of the third and fourth codebook configurations, two identical beams overlap/are redundant between beam groups specified by adjacent PMIs (indices) (particularly, W1). Accordingly, in the case of the third and fourth codebook configurations, a UE must be defined to feed back a preferred beam group index with respect to only a specific non-overlap/redundant beam group, such as that i1 is limited to be reported as an even number or an odd number, thereby being capable of reducing feedback overhead.

In the present embodiment, in order to solve problems such as beam overlap/redundancy, in a hybrid CSI-based scheme in which Class A and Class B have been combined, only the first codebook configuration (and/or the second codebook configuration) may be limited to be used when a Class A CSI is reported.

In the present embodiment, a UE may additionally feed back, to a base station, codebook configuration information regarding that Class A CSI is reported using (or based on) which codebook configuration. That is, the base station does not separately indicate a codebook configuration with respect to the UE through RRC signaling (or configure/indicate a specific codebook configuration (e.g., an x-th codebook configuration (e.g., x=1)) as a default codebook configuration configured with respect to the UE). The UE may directly select a codebook configuration having many preferred beams from the first to fourth codebook configurations, and may feed it back to the base station.

Such a feedback operation of codebook configuration information may be defined as a new CSI reporting type within a (hybrid) CSI chain/procedure (and/or may be joint-encoded with the existing CSI reporting type) and may be defined/configured/triggered so that it is performed in a separate different UL transmission procedure. The second to fourth codebook configurations include a beam group including the first codebook configuration. Accordingly, the codebook configuration information feedback operation according to the present embodiment has an advantage in that it can adaptively apply beamforming according to horizontal and vertical angle spread.

The feedback operation of codebook configuration information may be associated with a hybrid CSI chain/procedure and operate therewith, and may be identically applied to a non-hybrid chain/procedure (i.e., when CSI of one class type is reported within one CSI procedure). For example, if only CSI of Class A (or Class B) type has been configured to be reported within one CSI procedure, a base station may not signal to a UE for codebook configuration information. The UE may directly feed back to the base station that CSI of Class A (or Class B) type (i.e., codebook configuration information) is reported using (or based on) which codebook configuration.

D. Multiple PMIs

A UE selects a plurality of (preferred) PMIs assuming Rank 1 based on antenna port layouts (N1, N2) configured through higher layer signaling, oversampling factors (O1, O2) and/or a Class A codebook (or CSI configuration information) corresponding to a codebook configuration (Codebook Config), and reports/feeds it back to a base station.

D-1. The First Codebook Configuration

In the first codebook configuration, when a UE reports a plurality of PMIs, the UE may select best m (m>0) PMIs using metric, such as a channel quality indicator (CQI) and/or a signal-to-noise ratio (SINR), and may report them to a base station.

For another example, a UE may select one best PMI and an RI corresponding to the one best PMI. Furthermore, the UE may additionally select worst PMI (and/or second best PMI, third best PMI, . . . , etc.) and report it to a base station. The worst PMI (and/or the second best PMI, the third best PMI, . . . , etc.) is used for the MU scheduling of the base station, thereby being capable of improving MU performance.

D-2. Second to fourth codebook configurations

In the case of the second to fourth codebook configurations, a UE may report multiple PMI indices derived based on the second, third or fourth codebook configuration, may select best m (m>0) PMIs using metric such as a CQI and/or an SINR, and may report them to a base station. In particular, in the case of the third and fourth codebook configurations, two identical beams overlap/are redundant between beam groups specified by adjacent PMIs (indices) (particularly, W1). Accordingly, in the case of the third and fourth codebook configurations, a UE must be defined to feed back a preferred beam group index with respect to a specific non-overlap/redundant beam group only, such as that i1 is limited to be reported as only an even number or an odd number, thereby being capable of reducing feedback overhead.

For another example, a UE may select one best PMI and an RI corresponding to the one best PMI. Furthermore, the UE may additionally select worst PMI (and/or second best PMI, third best PMI, . . . , etc.) and report it to a base station. The worst PMI (and/or the second best PMI, the third best PMI, . . . , etc.) may be used for the MU scheduling of the base station, thereby being capable of improving MU performance.

In the present embodiment, in order to solve problems, such as beam overlap/redundancy, in a hybrid CSI-based scheme in which Class A and Class B have been combined, only the first codebook configuration (and/or the second codebook configuration) may be limited to be used when Class A CSI is reported.

Furthermore, in the present embodiment, a UE may additionally feed back, to a base station, codebook configuration information regarding that Class A CSI is reported using (or based on) which codebook configuration. That is, the base station does not separately indicate a codebook configuration with respect to the UE through RRC signaling (or configure/indicate a specific codebook configuration (e.g., an x-th codebook configuration (e.g., x=1)) as a default codebook configuration with respect to the UE). The UE may directly select a codebook configuration having many preferred beams from the first to fourth codebook configurations, and may feed it back to the base station.

Such a feedback operation of codebook configuration information may be defined as a new CSI reporting type within a (hybrid) CSI chain/procedure (and/or may be joint-encoded with the existing CSI reporting type) or may be defined/configured/triggered so that it is separately performed in a different UL transmission procedure. The second to fourth codebook configurations include a beam group including the first codebook configuration. Accordingly, the codebook configuration information feedback operation according to the present embodiment has an advantage in that it can adaptively apply beamforming according to horizontal and vertical angle spread.

The feedback operation of codebook configuration information according to the present embodiment may be associated with a hybrid CSI chain/procedure and operate therewith, and may be identically applied to a non-hybrid chain/procedure (i.e., when CSI of one class type is reported within one CSI procedure). For example, if only CSI of Class A (or Class B) type has been configured to be reported within one CSI procedure, a base station may not signal to a UE for codebook configuration information. The UE may directly feed back to the base station that CSI of Class A (or Class B) type (i.e., codebook configuration information) is reported using (or based on) which codebook configuration.

In the proposed hybrid CSI-RS-based schemes, if one PMI (and RI) report has been configured when a Class A configuration/operation is performed, limitation may be applied so that a W2-only codebook, that is, a Class B codebook in which a PMI-Config parameter value has been set to "1" (class B 'PMI-Config=1' codebook) when the Class B configuration/operation is performed, is used. In this case, the W2-only codebook means a specific codebook previously defined based on only W2, and may correspond to a codebook through which only beam selection and co-phasing functions are performed.

Furthermore, in the aforementioned embodiments, a 2D PMI reported when a Class A operation is performed may be decomposed into a vertical component and a horizontal component, and may be used for vertical (or horizontal) beamforming when a Class B operation is performed. That is, a base station may decompose i1, reported by a UE in Class A, into i11 and i12, and may perform beamforming using only i11 or i12 in Class B. In this case, i11 corresponds to a codebook index of an N1 domain (i.e., the first domain), and i12 corresponds to a codebook index of an N2 domain (i.e., the second domain). Alternatively, in the hybrid CSI-RS-based scheme, the Class A configuration/operation may be limited so that a UE reports/feeds back only i11 or i12. i11 or i12 may be defined as a separate CSI reporting type or may be defined in a joint-encoding form with the existing legacy CSI reporting type, so a UE reports it to a base station in the Class A operation.

2. Hybrid CSI-RS-Based Scheme of Class B and Class B Combinations

Hereinafter, there is proposed a signaling method when the hybrid CSI-RS-based scheme using the two Class B eMIMO-types is operated. Class B may be divided into (K>1) and (K=1). In this case, K indicates the number of CSI-RS resources configured in a UE. Accordingly, there is proposed a signaling method in the hybrid CSI-RS-based scheme for each combination of Class B divided based on K. In the hybrid CSI-RS-based scheme, a UE reports CSI in a relatively long period in the case of the first eMIMO-type and in a relatively short period in the case of the second eMIMO-type.

2-1. Case of Class B (K>1) and Class B (K=1) Combination

In the first eMIMO-type (Class B K>1), the following cases A-E may be classified based on information (e.g., CRI, PMI, CQI and/or RI) reported from a UE to a base station.

A. When a UE Reports Only a CRI in the First eMIMO-Type (Class B (K>1))

A base station applies beamforming to each of K CSI-RS resources in the first eMIMO-type (class B (K>1)). A UE may report a CRI, corresponding to the most preferred resource of the K CSI-RS resources, to the base station. In this case, the base station determines beamforming to be used in the second eMIMO-type (class B (K=1)) based on the reported CRI. The UE may derive a PMI/RI/CQI (based on a beamformed and transmitted CSI-RS) using a legacy codebook (e.g., 4TX household, Rel-10 8Tx, Rel-12 4Tx and/or Rel-13 8Tx), and may report it to the base station. Information (e.g., Class B PMI-Config=1 or 2) about a PMI to be used in the second eMIMO-type (class B (K=1)) may be reported to the base station along with the CRI in the first eMIMO-type (class B (K>1)), or the base station may notify the UE of the information through RRC signaling.

If a UE has reported both a CRI and an RI to a base station in the first eMIMO-type (class B (K>1)), the base station may perform beamforming based on the reported CRI in the second eMIMO-type (class B (K=1)), and may transmit a CSI-RS to the UE. In this case, the UE may assume that a rank in the second eMIMO-type (class B (K=1)) is limited to an RI reported in the first eMIMO-type (class B (K>1)), or may assume that an RI reported in the first eMIMO-type (class B (K>1)) is limited to a maximum rank (i.e., a maximum number of transmission layers). In this case, the UE may report only a PMI and/or a CQI other than the RI in the second eMIMO-type (class B (K=1)). As a result, there is an effect in that feedback overhead and UE complexity of a hybrid CSI procedure of all of Class B (K>1)+Class B (K=1) combinations are reduced.

Alternatively, a base station may directly notify a UE of a maximum rank capable of reporting through RRC signaling or may previously set the maximum rank in the UE as a specific value.

For another example, a UE may report a plurality of CRIs in the first eMIMO-type (class B (K>1)). In this case, in the second eMIMO-type (class B (K=1)), a base station may perform beamforming (i.e., CSI-RS beamforming and transmission) by performing virtualization on the 1 or 2 port using a beamforming coefficient generated based on a plurality of CRIs. The UE reports a PMI/RI/CQI (based on the beamformed and transmitted CSI-RS) using a specific codebook (e.g., W2-only codebook) corresponding to Class B 'PMI-Config=1'. A more detailed example thereof is described later with reference to FIG. 16.

Figure 16:
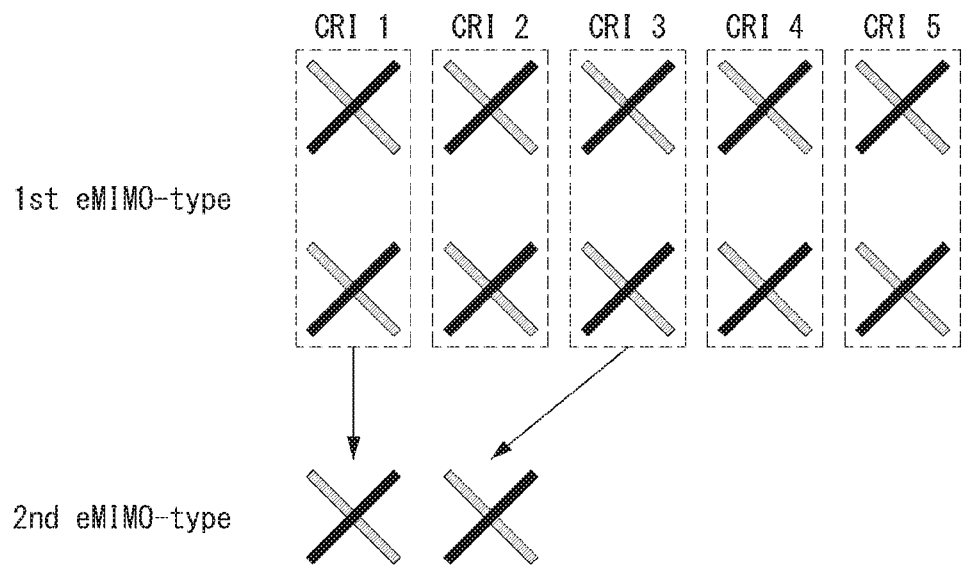
FIG. 16 is a diagram illustrating an embodiment in which a UE reports a plurality of CRIs in a first eMIMO-type according to an embodiment of the present invention.

FIG. 16 is a diagram illustrating an embodiment in which a UE reports a plurality of CRIs in the first eMIMO-type according to an embodiment of the present invention. In particular, in the embodiment of FIG. 16, a case where (N1, N2, O1, O2)=(2, 5, 2, 20) has been configured and K=5, Nk=4 (k=1, 2, 3, 4, 5) have been configured in the first eMIMO-type (class B (K>1)) is assumed.

Referring to FIG. 16, a case where five CSI-RSs (corresponding to five different CRIs) in the first eMIMO-type (class B (K>1)) may be transmitted through different vertical beamforming and a UE may select a specific CSI-RS (e.g., preferred/best CSI-RS) from the five CSI-RSs and report a CRI, corresponding to the selected CSI-RS, to a base station may be assumed. For example, a case where the UE has selected the CRIs 1 and 3 and reported them to the base station may be assumed. In this case, the base station may configure/operate Class B (K=1) (or transmit a CSI-RS to which beamforming has been applied to the UE) using the CRIs 1 and 3 reported by the UE through the first eMIMO-type (class B (K>1)) in the second eMIMO-type. The UE reports a PMI/CQI/RI (based on the beamformed and transmitted CSI-RS) based on the Class B 'PMI-Config=1' codebook (i.e., W2-only codebook). In this case, the base station may previously notify the UE of the number of CRIs (maximum number of CRIs that may be reported) reported in the first eMIMO-type through RRC or a maximum number of CRIs may be previously defined/configured.

For another example, a UE may be configured to report a plurality of CRIs in the first eMIMO-type (class B (K>1)) and a parameter "PMI-Config" related to a PMI configuration to be used in the second eMIMO-type (class B (K=1)). If a "PMI-Config" value is 1, the UE may operate as in the example of FIG. 16. If a difference between the values of CRI division metrics represented as an SINR and/or a CQI corresponding to reported multiple CRIs is very great, the usefulness of the multiple CRIs reported by a UE may be low. Accordingly, in this case, the UE may be previously defined/configured to report a "PMI-Config" value as "2" (indicate the use of a legacy codebook) in the first eMIMO-type (class B (K>1)) or to assume the "PMI-Config" value to be 2 in the second eMIMO-type (class B (K=1)) if all of reported multiple CRIs are the same value without "PMI-Config".

In another embodiment, a UE may report multiple worst CRIs as a plurality of CRIs reported in the first eMIMO-type (class B (K>1)) in the example of FIG. 16. For example, when a UE reports the CRIs 2, 4 and 5 in the first eMIMO-type (class B (K>1)), the CRIs 2, 4 and 5 may be excluded when the second eMIMO-type (class B (K=1)) beamforming is performed.

A UE may report whether a reported CRI is the best CRI or the worst CRI to a base station. Corresponding information may be used as side information in the scheduling of the base station. Alternatively, the base station may notify the UE of whether a CRI reported by the UE is the best CRI or the worst CRI through RRC.

B. When a UE Reports a CRI and a PMI in the First eMIMO-Type (Class B (K>1))

A UE may report a plurality of CRIs and PMIs corresponding to/associated with the CRIs, respectively, in the first eMIMO-type (class B (K>1)). In this case, in the second eMIMO-type (class B (K=1)), a base station may perform beamforming (i.e., CSI-RS beamforming and transmission) by performing virtualization on the 1 or 2 port using a beamforming coefficient generated based on the plurality of CRIs and PMIs. The UE reports a PMI/RI/CQI (based on the beamformed and transmitted CSI-RS) using a specific codebook (e.g., W2-only codebook) corresponding to Class B 'PMI-Config=1'. A more detailed example thereof is described later with reference to FIG. 17.

Figure 17:
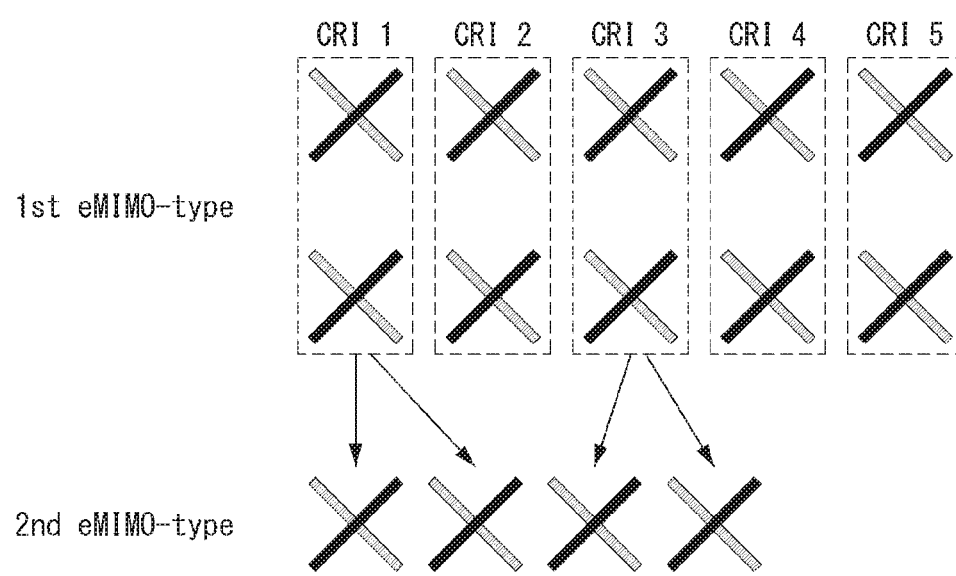
FIG. 17 is a diagram illustrating an embodiment in which a UE reports a plurality of CRIs and PMIs in the first eMIMO-type according to an embodiment of the present invention.

FIG. 17 is a diagram illustrating an embodiment in which a UE reports a plurality of CRIs and PMIs in the first eMIMO-type according to an embodiment of the present invention. In particular, in the embodiment of FIG. 17, a case where (N1, N2, O1, O2)=(2, 5, 2, 20) has been configured, K=5, Nk=4 (k=1, 2, 3, 4, 5) have been configured in the first eMIMO-type (class B (K>1)), and N1=8 has been configured in the second eMIMO-type (class B (K=1)) is assumed.

Referring to FIG. 17, in the first eMIMO-type (class B (K>1)), 5 CSI-RSs (corresponding to 5 different CRIs) may be transmitted through different vertical beamforming. A UE may select specific CSI-RSs (e.g., preferred/best CSI-RSs) of the 5 CSI-RSs, and may report, to a base station, a plurality of CRIs corresponding to the selected CSI-RSs and a PMI corresponding to the plurality of CRIs. For example, a case where a UE has selected the CRIs 1 and 3 and has reported, to a base station, a PMI corresponding to the CRIs 1 and 3 may be assumed. In this case, in the second eMIMO-type (class B (K=1)), the base station may configure/perform Class B (K=1) (i.e., beamform and transmit the CSI-RS of a class B type) by configuring/applying beamforming on ports configured as an x-pol using the reported CRIs 1 and 3 and a PMI corresponding to the CRIs (or a subset of the PMI). The UE may report a PMI/CQI/RI (based on the beamformed and transmitted CSI-RSs) using a Class B W2-only codebook (i.e., PMI-Config=l).

The base station may notify the UE of the number of CRIs (maximum number of CRIs that may be reported) reported in the first eMIMO-type (class B (K>1)) through RRC or a maximum number of CRIs may be previously defined/configured. The PMI reported in the first eMIMO-type (class B (K>1)) may be limited/assumed to be the index of W1 i1 if it has a dual codebook structure as in Rel-10 8Tx or Rel-12 4Tx. Such a limit/assumption may be identically applied to the following embodiments. Furthermore, in order to perform/apply various beamforming using a PMI corresponding to/associated with multiple CRIs in the second eMIMO-type (class B (K=1)), the number of antenna ports of K=1 in the second eMIMO-type (class B (K=1)) may be limited to a specific value (e.g., N1=8).

C. When a UE Reports a PMI/RI for Each K CSI-RS Resource in the First eMIMO-Type (Class B (K>1))

In the first eMIMO-type (class B (K>1)), beamforming is performed for each K CSI-RS resource. A UE may report a PMI/RI each CSI-RS resource. A base station may calculate a beamforming coefficient using information of a reported PMI/RI, and may perform beamforming (i.e., CSI-RS beamforming and transmission) in the second eMIMO-type (class B (K=1)) using the calculated beamforming coefficient. In the second eMIMO-type (class B (K=1)), the UE may report a PMI/CQI/RI (based on the beamformed and transmitted CSI-RS) to the base station.

The UE may additionally report a CQI and/or the (best and/or worst) CRI in the first eMIMO-type (class B (K>1)) as side information for calculating the best beamforming.

The PMI reported in the first eMIMO-type (class B (K>1)) may be limited/assumed to be the index of W1 i1 if it has a dual codebook structure as in Rel-10 8Tx or Rel-12 4Tx.

D. When a UE reports only a PMI for each K CSI-RS resource in the first eMIMO-type (class B (K>1))

Beamforming is performed for each K CSI-RS resource in the first eMIMO-type (class B (K>1)). A UE may report a PMI for each CSI-RS resource under rank 1 restriction/assumption. A base station may calculate a beamforming coefficient using the reported information, and may perform beamforming (i.e., CSI-RS beamforming and transmission) in the second eMIMO-type (class B (K=1)) using the calculated beamforming coefficient. In the second eMIMO-type (class B (K=1)), the UE may report a PMI/CQI/RI (based on the beamformed and transmitted CSI-RS) to the base station.

The UE may additionally report a CQI and/or the (best and/or worst) CRI in the first eMIMO-type (class B (K>1)) as side information for calculating the best beamforming. In this case, the RI reported in B. Embodiment may be interpreted again and used for the best CRI report of the UE. In other words, if a plurality of CRIs is reported, an RI may be interpreted again as indicating the number of reported (best) CRIs not a rank. In this case, one RI may be considered as having a corresponding relation with a plurality of CRIs. In this case, there is an advantage in that signaling overhead is reduced because separate signaling for indicating the number of CRIs is not necessary. This method may be identically applied to all of embodiments in which an RI and a plurality of CRIs are reported together in addition to B. Embodiment.

E. When a UE determines the transmission port of the second eMIMO-type (class B (K=1)) in the first eMIMO-type (class B (K>1))

In the first eMIMO-type (class B (K>1)), a base station configures a different Nk for each K CSI-RS resource (e.g., K=3, N1=2, N2=4, N3=8), and performs beamforming. A UE may report the best CRI, PMI and/or RI based on the different Nk. A base station may determine the number of (CSI-RS) ports of the second eMIMO-type (class B (K=1)) based on the reported CRI information and perform/apply beamforming using a reported PMI/RI. The UE may report a PMI/CQI/RI (based on the beamformed and transmitted CSI-RS). In the first eMIMO-type (class B (K>1)), the UE may additionally report information (e.g., PMI-Config=1 or 2) about a codebook to be used in the second eMIMO-type (class B (K=1)) to the base station.

2-2. Case of Class B (K=1) and Class B (K=1) Combination

In the first eMIMO-type (Class B K=1), the following cases A-C may be classified based on information (e.g., PMI, CQI and/or RI) reported from a UE to a base station.

A. When a UE reports a PMI/CQI/RI in the first eMIMO-type (class B (K=1))

A UE may report a PMI/CQI/RI based on a legacy codebook in the first eMIMO-type (class B (K>1)). A base station performs/configures beamforming (i.e., transmits a CSI-RS to which beamforming has been applied) of the second eMIMO-type (class B (K=1)) based on the PMI/CQI/RI information reported by the UE in the first eMIMO-type (class B (K=1)). The UE may report a PMI/CQI/RI (based on the beamformed and transmitted CSI-RS).

In an embodiment, a base station may map a beam virtualized at a specific vertical and/or horizontal angle to a subset of a given N1 port (e.g., map beams having different angles to two x-pol when N1=4). A UE may report a PMI/CQI/RI using a Class B W2-only codebook. The base station performs vertical and/or horizontal virtualization based on CSI reported in the second eMIMO-type (class B (K=1)).

B. When a UE Reports Only a PMI in the First eMIMO-Type (Class B (K=1))

In an embodiment, a base station may place limitation so that a Rel-12 4Tx codebook having a widely spaced beam group is configured/applied by configuring N1=4 in the first eMIMO-type (class B (K=1)) under the rank 1 restriction/assumption. In this case, in the second eMIMO-type (class B (K=1)), the base station maps widely spaced 4 beams or a subset of the 4 beams, reported by a UE, to respective ports configured in the second eMIMO-type (class B (K=1)), and constructs/configures/performs beamforming. The UE may report a PMI/RI/CQI (based on the beamformed and transmitted CSI-RS) using a W2-only codebook.

In another embodiment, a base station may place limitation so that a Rel-10 8Tx codebook having a closely spaced beam group is configured/applied by configuring N1=8 in the first eMIMO-type (class B (K=1)) under rank 1 restriction/assumption. In this case, in order to configure UE specific-beamforming in the second eMIMO-type (class B (K=1)), the base station linearly combines 4 beams configuring a closely spaced W1 reported by a UE, maps the 4 beams to respective ports configured for the second eMIMO-type (class B (K=1)), and constructs/configures/performs beamforming. The UE may report a PMI/RI/CQI (based on the beamformed and transmitted CSI-RS) using a W2-only codebook.

C. When a UE Determines the Transmission Port of the Second eMIMO-Type (Class B (K=1)) in the First eMIMO-Type (Class B (K=1))

Figure 18:
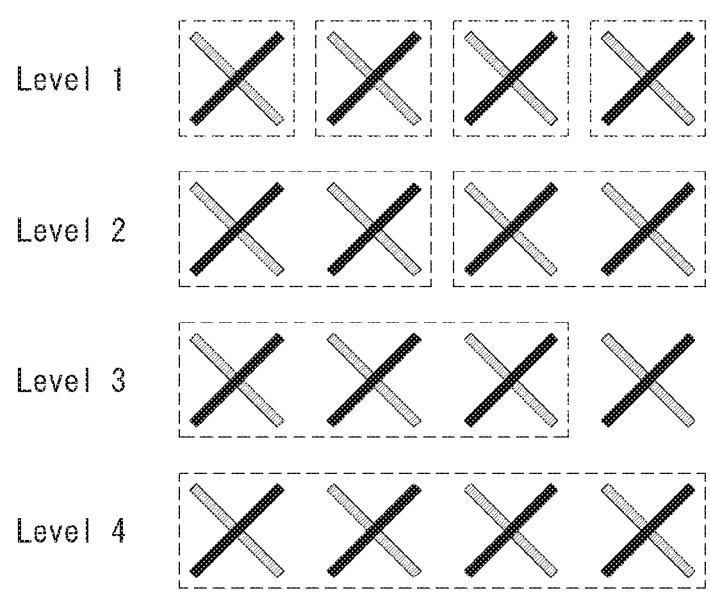
FIG. 18 is a diagram illustrating an embodiment in which the transmission port of a second eMIMO-type is determined in the first eMIMO-type according to an embodiment of the present invention.

FIG. 18 is a diagram illustrating an embodiment in which the transmission port of the second eMIMO-type is determined in the first eMIMO-type according to an embodiment of the present invention. A case where K=1 and N1=8 are configured in the first eMIMO-type (class B (K=1)) of the embodiment of FIG. 18 is assumed.

In the first eMIMO-type (class B (K=1)), a base station may configure/apply beamforming to an N1 port (e.g., N1=1, 2, 4 or 8), configured through RRC, in a 1 or 2 port (co-pol or X-pol) unit. This figure illustrates a case where beamforming has been applied in a 2-port unit. A UE may select the most preferred port pair using a specific metric (e.g., reference signal received power (RSRP), a CQI and/or an SINR) for each port-pair group or for each port pair within a subset of port-pair groups, and may report the selected port-pair, level and/or PMI information to a base station independently or in an integrated manner. In this case, the level may be defined the grouping of port pairs.

Furthermore, a different codebook (e.g., level 1: Class B codebook, level 2: Rel-12 4 Tx, level 3: a given 6 Tx codebook, level 4: Rel-10 8 Tx codebook) may be applied for each level. A base station may signal/notify a UE of codebook information applied for each level or the UE may report codebook information, used by the UE, to the base station. In this case, in the second eMIMO-type (class B (K=1)), the base station determines a port number N2 based on the reported information, and applies beamforming. The UE reports a PMI/CQI/RI (based on a beamformed and transmitted CSI-RS).

For another example, a UE may report port-pair and level information and a PMI/RI in the first eMIMO-type (class B (K=1)). Alternatively, the base station may newly interpret and use an RI, reported by the UE, as information indicating a level in the first eMIMO-type (class B (K=1)). In this case, the UE may not separately report level information to the base station in the first eMIMO-type (class B (K=1)).

2-3. Case of Class B (K=1) and Class B (K>1) Combination

A. When a UE Reports Only a PMI in the First eMIMO-Type (Class B (K=1))

In the first eMIMO-type (class B (K=1)), a base station may configure/apply a Rel-12 4Tx/8Tx codebook or household codebook under rank 1 assumption/restriction. A UE may report only a PMI. In the second eMIMO-type (class B (K>1)), the base station may use 4 beams or a subset of the 4 beams, corresponding to the PMI reported in the first eMIMO-type (class B (K=1)), for the antenna port virtualization of the vertical or horizontal domain. That is, in the second eMIMO-type (class B (K>1)) in which K has been set to 4 or less, beamforming having a different vertical or horizontal tilting angle for each K CSI-RS resource is configured. The UE may report each PMI/RI/CQI for each K CSI-RS resource or may report the best CRI and one PMI/RI/CQI corresponding to/associated with the best CRI.

B. When a UE Reports a PMI/RI in the First eMIMO-Type (Class B (K=1))

In the first eMIMO-type (class B (K=1)), a base station may configure/apply a Rel-12 4Tx/8Tx codebook or household codebook under rank 1 assumption/restriction. A UE may report a PMI and RI. In the second eMIMO-type (class B (K>1)), a beam group corresponding to the PMI and RI reported in the first eMIMO-type (class B (K=1)) may be used for the antenna port virtualization of a K vertical or horizontal domain.

For example, when an RI is reported as 3 in the first eMIMO-type (class B (K=1)) in which a Rel-12 4Tx codebook has been configured, a total of 8 beams are configured as W1. If K=4 in the second eMIMO-type (class B (K>1)), a base station may select 4 beams of the 8 beams and configure virtualization. As an example of selection, virtualization may be configured by sequentially applying beams within a 1 beam group.

Alternatively, if a W2 only codebook is used in the first eMIMO-type (class B (K>1)), a maximum value of an RI may be determined based on K of the second eMIMO-type (class B (K>1)) configured through RRC. For example, if K=2, a maximum value of an RI may be determined to be 2.

In the second eMIMO-type (class B (K>1)), beamforming having a different vertical or horizontal tilting angle for each K CSI-RS resource is configured. A UE may report each PMI/RI/CQI for each K CSI-RS resource or may report the best CRI and one PMI/RI/CQI corresponding to/associated with the best CRI.

As another example, in the first eMIMO-type (class B (K=1)), if a W2 only codebook is used, the number of CSI-RS resources used/activated in the second eMIMO-type (class B (K>1)) may be determined based on a reported RI. For example, a reported RI and the number of CSI-RS resources may be determined identically. For example, if an RI reported in the first eMIMO-type (class B (K=1)) is 2 and K is 4, the number of CSI-RS resources used/activated the second eMIMO-type (class B (K>1)) may be determined to be "2." In this case, a UE may configure beamforming having a different vertical or a horizontal tilting angle every two CSI-RS resources in the second eMIMO-type (class B (K>1)) and may report each PMI/RI/CQI every two CSI-RS resources or report the best CRI and one PMI/RI/CQI corresponding to the best CRI.

C. If PMI-Config=1 is Configured in the Second eMIMO-Type (K>1)

In the first eMIMO-type (class B (K=1)), a base station may configure/apply a Rel-12 4Tx/8Tx codebook or household codebook. A UE may report a PMI and/or an RI. In the second eMIMO-type (class B (K>1)), a beam group corresponding to the PMI and/or RI reported in the first eMIMO-type (class B (K=1)) may be used for the antenna port virtualization of K vertical or horizontal domains.

For example, if an RI has been reported as 3 in the first eMIMO-type (class B (K=1)) in which a Rel-12 4Tx codebook has been configured, a total of 8 beams are configured as W1. If K=4 in the second eMIMO-type (class B (K>1)), a base station may select 4 beams of the 8 beams and configure virtualization. As an example of selection, virtualization may be configured by sequentially applying beams within the W1 beam group.

In the second eMIMO-type (class B (K>1)), Class B PMI-Config=1 (i.e., W2 only codebook) may be configured in a base station for each K CSI-RS resource, and the base station may perform different beamforming for each co-pol or X-pol of a port configured as Nk (k=1, 2, . . . , K). A UE may report a PMI/RI/CQI (based on a beamformed and transmitted CSI-RS) using a W2 only codebook. Alternatively, the UE may report a PMI/RI/CQI using a W2 only codebook with respect to a resource corresponding to the best CRI of the K CSI-RS resources.

As another example, a case where Nk=8 has been configured in N1=4 in the first eMIMO-type (class B (K=1)) and K=2 in the second eMIMO-type (class B (K>1)) may be assumed. In this case, in the number of PMIs reported using the first eMIMO-type (class B (K=1)), the number of beams represented by i1 may be 4 in the case of Rank 1-2, and the number of beams represented by i1 may be 8 (different four orthogonal beam pairs) in the case of Rank 3-4. Accordingly, in the case of Ranks 3-4, beamforming is configured by mapping a total of 8 beams to two CSI-RS resources. In the second eMIMO-type (class B (K>1)), a UE may report a PMI/RI/CQI using a W2 only codebook for each K CSI-RS resource. Alternatively, the UE may report a PMI/RI/CQI using a W2 only codebook with respect to a resource corresponding to the best CRI of the K CSI-RS resources. In the case of Ranks 1-2, K=1 may be limited and an operation identical with K=1 may be performed.

If the aforementioned embodiment is generalized, K, that is, the number of CSI-RS resources used/activated in the second eMIMO-type (class B (K>1)), may be configured/determined based on an RI reported in the first eMIMO-type (class B (K=1)). If Nk=2 or 4 in the second eMIMO-type (class B (K>1)), K when Nk=8 may be expanded and applied as a positive number times or a subset of 8 beams may be selected and applied with respect to the same K. For example, if RI=3, K=4 may be configured in the case of Nk=4, and K=8 may be configured in the case of Nk=2. Such an embodiment may be applied to a hybrid CSI procedure of a Class A+Class B (K>1) combination identically/similarly.

2-4. Case of Class B (K1>1) and Class B (K2>1) Combination

A. When a UE Reports Only a CRI in the First eMIMO-Type (Class B (K1>1))

In an embodiment, a UE may report a plurality of CRIs in the first eMIMO-type (class B (K1>1)). In this case, in the second eMIMO-type (class B (K2>1)), a base station may differently apply antenna port virtualization of the vertical or horizontal domain for each K2 CSI-RS resource using a beamforming coefficient generated based on the plurality of CRIs reported in the first eMIMO-type (class B (K1>1)). In this case, the number of the plurality of CRIs reported by the UE in the first eMIMO-type (class B (K1>1)) may be limited to K2 or less. Alternatively, the number of CSI-RS resources used/activated in the second eMIMO-type (class B (K2>1)) may be determined based on the number of CRIs reported by the UE. For example, if the number of reported CRIs is 2 and K1=4 and K2=4 are configured, the number of CSI-RS resources actually used/activated in the second eMIMO-type (class B (K2>1)) may be determined to be 2. In this case, in the second eMIMO-type, the base station may configure beamforming having a different vertical or horizontal tilting angle every two CSI-RS resources. The UE may report each PMI/RI/CQI for each CSI-RS resource of CRIs (two in the case of the present embodiment) or may report the best CRI and one PMI/RI/CQI corresponding to the best CRI.

B. When a UE Reports a CRI and a PMI Corresponding to the CRI in the First eMIMO-Type (Class B (K1>1))

In an embodiment, in the first eMIMO-type (class B (K1>1)), a UE may report the best CRI for a K1 CSI-RS resource and a PMI corresponding to the best CRI by configuring/applying a Rel-12 4Tx/8Tx codebook or household codebook under rank 1 assumption/restriction. In the second eMIMO-type (class B (K2>1)), 4 beams corresponding to the PMI reported in the first eMIMO-type (class B (K1>1)) or a subset of the 4 beams may be used for antenna port virtualization of the vertical or horizontal domain. That is, in the second eMIMO-type (class B (K2>1)) in which K2 has been set to 4 or less, a base station may configure beamforming having a different vertical or horizontal tilting angle for each K2 CSI-RS resource. The UE may report each PMI/RI/CQI for each K2 CSI-RS resource or may report the best CRI and one PMI/RI/CQI corresponding to the best CRI.

C. When a UE Reports a CRI and a PMI/RI Corresponding to the CRI in the First eMIMO-Type (Class B (K1>1))

In an embodiment, in the first eMIMO-type (class B (K1>1)), a UE may report the best CRI for a KI CSI-RS resource and a PMI corresponding to the best CRI by configuring/applying a Rel-12 4Tx/8Tx codebook or household codebook under rank 1 assumption/restriction. In the second eMIMO-type (class B (K2>1)), a base station may use a K2 beam, corresponding to the PMI reported in the first eMIMO-type (class B (K1>1)), for antenna port virtualization of the vertical or horizontal domain. In the second eMIMO-type (class B (K2>1)), the base station may configure beamforming having a different vertical or horizontal tilting angle for each K2 CSI-RS resource. The UE may report each PMI/RI/CQI for each K2 CSI-RS resource or may report the best CRI or one PMI/RI/CQI corresponding to the best CRI.

The embodiments regarding a signaling method in the hybrid CSI-RS-based scheme have been described.

In this specification, it is evident that the "rank 1 assumption/restriction" may be generalized into "specific rank assumption/restriction." That is, since a codebook determined in the case of rank 1 or 2 assumption/restriction and a codebook determined in the case of rank 3 or 4 assumption/restriction may be different, specific rank assumption/restriction may be indicated to determine a specific codebook set as described above. For example, for an object of taking into consideration more orthogonal beams on a codebook, "rank 3, 4 assumption/restriction" or "rank 5, 6, 7, 8 assumption/restriction" may be indicated/configured.

Figure 19:
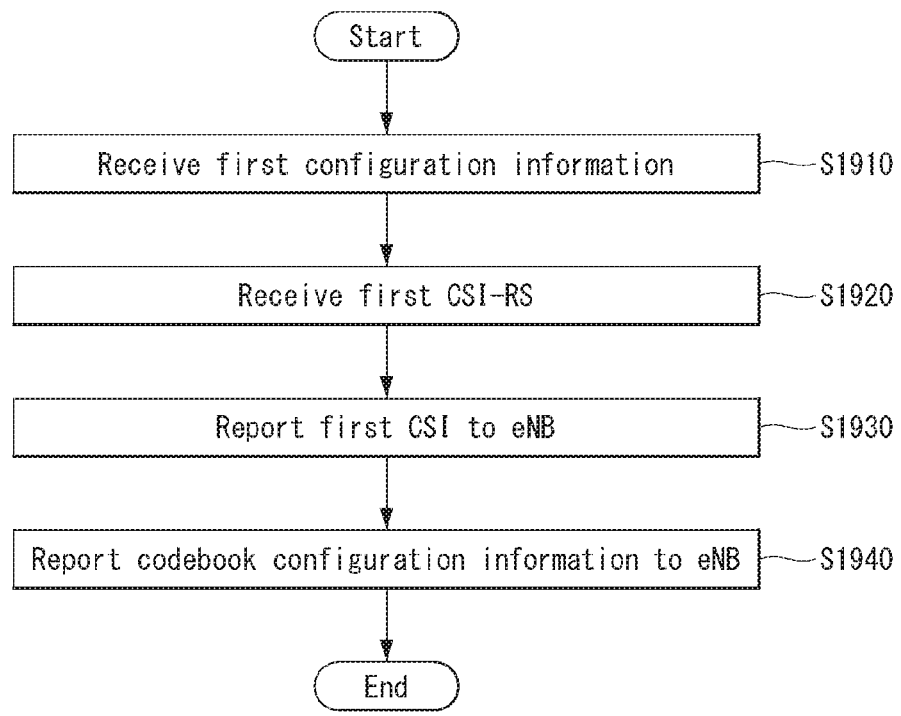
FIG. 19 is a flowchart regarding a CSI reporting method of a UE according to an embodiment of the present invention.

FIG. 19 is a flowchart regarding a CSI reporting method of a UE according to an embodiment of the present invention. The aforementioned embodiments may be applied identically/similarly in relation to this flowchart, and a redundant description is omitted.

First, a UE may receive first configuration information about a non-precoded first CSI-RS configuration from a base station (S1910). In this case, the first CSI-RS may indicate a CSI-RS of a Class A type. The first configuration information may include antenna port layout information, that is, a basis for generating first CSI, and oversampling factor information applied to an antenna layout, and may be transmitted to the UE through higher layer signaling.

Next, the UE may receive the first CSI-RS (S1920), and may report, to the base station, the first CSI generated based on the first CSI-RS (S1930).

Finally, the UE may report, to the base station, codebook configuration information about a codebook configuration, that is, a basis for generating the first CSI (S1940). The codebook configuration information may indicate at least one codebook configuration of a plurality of codebook configurations. The plurality of codebook configurations may be previously defined to have different beam patterns. Furthermore, the codebook configuration information may be reported to the base station independently of the first CSI or may be joint-encoded with the first CSI and reported to the base station according to embodiments.

The UE may report, to the base station, a plurality of PMIs derived based on the codebook configuration as the first CSI. The plurality of PMIs may be selected as many as a preset number determined based on a CQI and/or an SINR, and may be reported to the base station. If two identical beams overlap between beam groups specified by neighboring PMIs depending on a codebook configuration, a plurality of PMIs reported by the UE may be limited to be indicated as an even number or an odd number only.

The plurality of PMIs is derived based on the codebook configuration reported by the UE in the state in which the number of transmission layers has been assumed to be "1." An RI indicating the number of transmission layers may not be reported to the base station as the first CSI. Alternatively, at least one RI associated with at least one of the plurality of PMIs may be reported to the base station as the first CSI. If at least one RI is reported to the base station as the first CSI, one RI associated with a PMI having the best performance or a PMI having the worst performance among the plurality of PMIs, one RI associated with the plurality of PMIs in common or a plurality of RIs associated with the plurality of PMIs, respectively, may be reported.

Moreover, although not shown in this flowchart, a step for the UE to receive second configuration information for second CSI reporting based on a beamformed second CSI-RS from the base station and to report second CSI generated based on the second configuration information to the base station may be added. In this case, the second CSI-RS may indicate a CSI-RS of a Class B type. Such second configuration information, together with the first configuration information, may be received by the UE through configuration information for a single CSI process.

General Apparatus to which the Present Invention May be Applied

Figure 20:
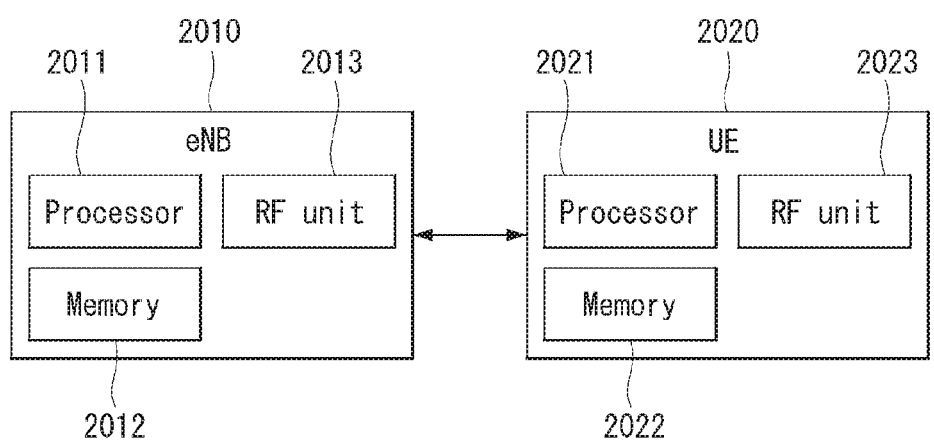
FIG. 20 illustrates a block diagram of a wireless communication apparatus according to an embodiment of the present invention.

FIG. 20 illustrates a block diagram of a wireless communication apparatus according to an embodiment of the present invention.

Referring to FIG. 20, the wireless communication system includes an eNB 2010 and multiple UEs 2020 positioned within the eNB 2010 area.

The eNB 2010 includes a processor 2011, memory 2012 and a radio frequency (RF) unit 2013. The processor 2011 implements the functions, processes and/or methods proposed in FIGS. 1 to 19. The layers of a radio interface protocol may be implemented by the processor 2011. The memory 2012 is connected to the processor 2011, and stores various types of information for driving the processor 2011. The RF unit 2013 is connected to the processor 2011 and transmits and/or receives radio signals.

The UE 2020 includes a processor 2021, memory 2022 and an RF unit 2023. The processor 2021 implements the functions, processes and/or methods proposed in FIGS. 1 to 19. The layers of a radio interface protocol may be implemented by the processor 2021. The memory 2022 is connected to the processor 2021, and stores various types of information for driving the processor 2021. The RF unit 2023 is connected to the processor 2021 and transmits and/or receives radio signals.

The memory 2012, 2022 may be positioned inside or outside the processor 2011, 2021 and may be connected to the processor 2011, 2021 by various well-known means. Furthermore, the eNB 2010 and/or the UE 2020 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

Although the present invention has been described based on an example in which it is applied to the 3GPP LTE/LTE-A system, it may be applied to various wireless communication systems in addition to the 3GPP LTE/LTE-A system.

What is claimed is:

1. A method for a user equipment to report channel state information (CSI) in a multi-antenna wireless communication system, the method comprising:
   receiving first configuration information about a non-precoded first channel state information-reference signal (CSI-RS) configuration from a base station;
   receiving first CSI-RS from the base station;
   reporting, to the base station, first CSI generated based on the first CSI-RS; and
   reporting, to the base station, codebook configuration information about a codebook configuration which is a basis for generating the first CSI, wherein the codebook configuration information represents a determined codebook configuration among a plurality of codebook configurations, the determined codebook configuration being related to a largest number of preferred beams with respect to a channel quality,
   wherein the first CSI includes a plurality of precoding matrix indicators (PMIs) derived based on the codebook configuration,
   wherein the plurality of PMIs includes at least one PMI having best performance and at least one PMI having worst performance, and
   wherein the at least one PMI having worst performance is related to MU (Multi-User) scheduling.

2. The method of claim 1, wherein the first configuration information comprises antenna port layout information which is a basis for generating the first CSI and oversampling factor information applied to an antenna layout and is transmitted to the user equipment through higher layer signaling.

3. The method of claim 2, wherein:
   the plurality of codebook configurations is previously defined to have different beam patterns.

4. The method of claim 3, wherein the codebook configuration information is reported to the base station independently of the first CSI or is joint-encoded with the first CSI and reported to the base station.

5. The method of claim 4, wherein the plurality of PMIs is selected as many as a preset number determined based on at least one of a channel quality indicator (CQI) or a signal-to-interference-plus-noise ratio (SINR) and is reported to the base station.

6. The method of claim 5, wherein based on two identical beams overlapping between beam groups specified by neighboring PMIs according to the codebook configuration, the plurality of PMIs is restricted to represent only a specific number related to a non-overlapping beam group.

7. The method of claim 6, wherein:
   the plurality of PMIs is derived based on the codebook configuration in a state in which a number of transmission layers is assumed to be "1", and
   a rank indicator (RI) indicating the number of transmission layers is not reported to the base station as the first CSI.

8. The method of claim 6, wherein at least one rank indicator (RI) associated with at least one PMI of the plurality of PMIs is reported to the base station as the first CSI.

9. The method of claim 8, wherein when the at least one RI is reported to the base station as the first CSI, one RI associated with a PMI having best performance or a PMI having worst performance among the plurality of PMIs, one RI associated with the plurality of PMIs in common, or a plurality of RIs associated with the plurality of PMIs, respectively, is reported.

10. The method of claim 5, further comprising:
    receiving, from the base station, second configuration information for a second CSI report based on a beamformed second CSI-RS; and
    reporting, to the base station, second CSI generated based on the second configuration information.

11. The method of claim 10, wherein the first configuration information and the second configuration information are received by the user equipment through configuration information for a single CSI process.

12. A user equipment for reporting channel state information (CSI) in a multi-antenna wireless communication system, the user equipment comprising:
    a radio frequency (RF) unit for transmitting and receiving radio signals; and
    a processor controlling the RF unit, wherein the processor is configured to:
   receive first configuration information about a non-precoded first channel state information-reference signal (CSI-RS) configuration from a base station;
   receive first CSI-RS from the base station;
   report, to the base station, first CSI generated based on the first CSI-RS; and
   report, to the base station, codebook configuration information about a codebook configuration which is a basis for generating the first CSI,
wherein the codebook configuration information represents a determined codebook configuration among a plurality of codebook configurations, the determined codebook configuration being related to a largest number of preferred beams with respect to a channel quality,
wherein the first CSI includes a plurality of precoding matrix indicators (PMIs) derived based on the codebook configuration,
wherein the plurality of PMIs includes at least one PMI having best performance and at least one PMI having worst performance, and
wherein the at least one PMI having worst performance is related to MU (Multi-User) scheduling.

13. The user equipment of claim 12, wherein:
the plurality of codebook configurations is previously defined to have different beam patterns.

14. The user equipment of claim 13, wherein the codebook configuration information is reported to the base station independently of the CSI or is joint-encoded with the CSI and reported to the base station.

* * * * *